United States Patent [19]

Koya

[11] Patent Number: 5,021,334
[45] Date of Patent: Jun. 4, 1991

[54] LIGHT-SENSITIVE ELEMENT FOR THE DIFFUSION TRANSFER PROCESS

[75] Inventor: Keizo Koya, Kanagawa, Japan

[73] Assignee: Fuji Photo Film Co., Ltd., Kanagawa, Japan

[21] Appl. No.: 462,172

[22] Filed: Jan. 8, 1990

[30] Foreign Application Priority Data

Jan. 10, 1989 [JP] Japan .................................. 1-3472

[51] Int. Cl.$^5$ .......................... G03C 5/54; G03C 7/26
[52] U.S. Cl. .................................. 430/562; 430/222; 430/223
[58] Field of Search ................ 430/223, 225, 562, 222

[56] References Cited

U.S. PATENT DOCUMENTS 4,043,752  8/1977  Kilmurry et al. ...................... 8/41 B
4,461,827  7/1984  Bergthaller et al. ................. 430/562
4,775,613  10/1988  Hirai et al. ........................... 430/562
4,783,396  11/1988  Nakamora et al. .................. 430/562

Primary Examiner—Richard L. Schilling
Attorney, Agent, or Firm—Sughrue, Mion, Zinn, Macpeak & Seas

[57] ABSTRACT

A light-sensitive element for the diffusion transfer process which comprises a support having thereon a light-sensitive silver halide emulsion layer having associated therewith a yellow dye providing compound represented by the following general formula (I):

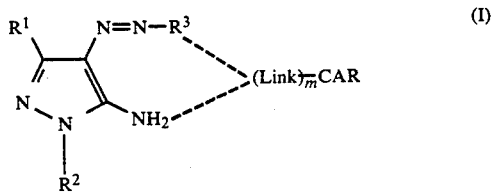

wherein CAR represents a carrier moiety which is capable of releasing a diffusible dye from the compound in correspondence or counter-correspondence to development under alkaline conditions; Link represents a group connecting CAR with a diffusible dye; m represents 0 or 1; the dotted lines mean that at least one of the dotted lines is a bond; $R^1$ represents a hydrogen atom, an alkyl group, an aryl group, an alkoxy group, an aryloxy group, an alkoxycarbonyl group, an aryloxycarbonyl group or a carbamoyl group; $R^2$ represents an alkyl group or an aryl group; and $R^3$ represents an aryl group excepting an aryl group having the Hammett's $\sigma_p$ value less than 0.01.

The yellow dye providing compound has a dye moiety whose transferability is high and whose hue is excellent and provides a stable yellow dye image which does not substantially change hue over a wide pH range.

8 Claims, No Drawings

LIGHT-SENSITIVE ELEMENT FOR THE DIFFUSION TRANSFER PROCESS

FIELD OF THE INVENTION

The present invention relates to a light-sensitive element for the diffusion transfer process and, more particularly, to a silver halide photographic light-sensitive element for the color diffusion transfer process containing a novel yellow dye providing compound.

BACKGROUND OF THE INVENTION

In the diffusion transfer photographic process, compounds having a dye compound moiety connected with a moiety for changing diffusibility are employed as dye providing compounds. The moiety for changing diffusibility means a moiety having a function capable of changing diffusibility of the dye providing compound before and after development processing under alkaline conditions. Dye providing compounds are classified into dye releasing type dye providing compounds and dye fixing type dye providing compounds depending on the function of the moiety for changing diffusibility.

Dye releasing type dye providing compounds are originally non-diffusible per se and provide diffusible dyes in correspondence or counter-correspondence to development by the function of the moiety for changing diffusibility as a result of development processing under alkaline conditions. Many dye releasing type dye providing compounds are known and are mainly divided into those having a negative acting mother skeleton which releases a dye upon oxidation and those having a positive acting mother skeleton which releases a dye upon reduction.

Examples of the negative acting dye providing compounds are described, for example, in JP-A-48-33826, JP-A-49-114424, JP-A-49-126331, JP-A-49-126332, JP-A-50-115528, JP-A 51-104343 (the term "JP-A" as used herein means an "unexamined published Japanese patent application"), U.S. Pat. Nos. 3,928,312, 3,931,144 and 3,954,476, and Research Disclosure, Vol. 130, No. 13024 (February, 1975).

Examples of the positive acting dye providing compounds include those having a moiety containing an electron acceptive center and an intramolecular nucleophilic displacement reaction center in a compound capable of releasing a photographic reagent upon a nucleophilic displacement reaction in the molecule after being reduced as described, for example, in U.S. Pat. Nos. 4,139,389, 4,139,379 and 4,564,577, JP-A-59-185333 and JP-A-57-84453; those having a moiety containing an electron acceptive quinoid center in a compound capable of releasing a photographic reagent upon an intramolecular electron transfer reaction after being reduced and a carbon atom bonding the quinoid center and the photographic reagent as described, for example, in U.S. Pat. No. 4,232,107, JP-A-59-101649, Research Disclosure, No. 24025 (1984), and JP-A-61 88257; those having a moiety containing an aryl group substituted with an electron attractive group in a compound capable of releasing a photographic reagent by cleaving the single bond after being reduced and an atom (sulfur atom, carbon atoms, or nitrogen atom) bonding the aryl group and the photographic reagent as described, for example, in West German Patent Application (OLS) No. 3,008,588, JP-A-56-142530, and U.S. Pat. Nos. 4,343,893 and 4,619,884; those having a moiety containing a nitro group in a nitro compound capable of releasing a photographic reagent after receiving an electron and a carbon atom bonding the nitro group and the photographic reagent as described, for example, in U.S. Pat. No. 4,450,223; and those having a moiety containing a dieminaldinitro moiety in a dinitro compound capable of β-releasing a photographic reagent after receiving an electron and a carbon atom bonding the dieminaldinitro moiety and the photographic reagent as described, for example, in U.S. Pat. No. 4,609,610.

Further, compounds of improved characteristics which contain a bond representatively illustrated by a bond of N—X (wherein X represents an oxygen atom, a sulfur atom or a nitrogen atom) and an electron attractive group in their molecules as described, for example, in European Patent 220,746A, U.S. Pat. No. 4,783,396, Kokai-Giho No. 87-6199, JP-A-62-215270, JP-A-62-244048, JP-A-63-201653, JP-A-63-201654, JP-A-63-271344, JP-A-63-271341 and JP-A-1-26842 are known.

Dye fixing type dye providing compounds are compounds which are originally diffusible or can release diffusible dyes and become non-diffusible or stop releasing diffusible dyes by the function of the moiety for changing diffusibility as a result of development processing. Examples of the dye fixing type dye providing compounds are described, for example, in JP-A-51-63618 and JP-A-53-35533.

On the other hand, with respect to dye compound moieties in the dye providing compounds, many investigations with respect to their hue, transferability, or fastness, etc. have been made. Reports on yellow dye providing compounds are illustrated in U.S. Pat. Nos. 3,597,200, 3,309,199, 4,013,633, 4,245,028, 4,156,609, 4,139,383, 4,195,992, 4,148,641, 4,148,643 and 4,336,322, JP-A-51-114930, JP-A-56-71072, Research Disclosure, No. 17630 (1978) and ibid., No. 16475 (1977).

As the result of these investigations, large improvements have been made in hue, transferability, fastness and stability of hue. However, it cannot be said that these compounds are satisfactory with respect to tolerance or the degree of freedom for designing and preparing of photographic element.

Particularly, when taking the stability of the transferred image into consideration, they do not have sufficient properties in both light fading and dark fading. Therefore, more stable dye compounds moieties have been desired. It is especially desired to improve the stability of color image, because there is the possibility of wide spread usage of the diffusion transfer process if improvements in the stability of the dye can be obtained.

Heat-resistivity and light-fastness greater than those requested for ordinary photographic images obtained by the diffusion transfer process are necessary for dyes for forming pattern images in color filters. The development of a stable dye would increase the possibility of the practical application thereof to such a field.

SUMMARY OF THE INVENTION

An object of the present invention is to provide a dye providing compound which provides a stable yellow dye image.

Another object of the present invention is to provide a yellow dye providing compound having a dye moiety whose hue is excellent.

Still another object of the present invention is to provide a yellow dye providing compound which provides a transferred image having less change in hue over a wide pH range.

A further object of the present invention is to provide a yellow dye providing compound having a dye moiety whose transferability is high.

A still further object of the present invention is to provide a light-sensitive material for the diffusion transfer process containing a dye providing compound which can be utilized in the production of a diffusion transfer process type micro color filter.

Other objects of the present invention will become apparent from the following detailed description and examples.

As a result of various investigations, it has been found that the above described objects are effectively attained with a light-sensitive element for the color diffusion transfer process containing a 5-aminopyrazole azo type yellow dye providing compound represented by the general formula (I) described below and, more specifically, with a light-sensitive element for the diffusion transfer process which comprises a support having thereon a light-sensitive silver halide emulsion layer having associated therewith a yellow dye providing compound represented by the following general formula (I):

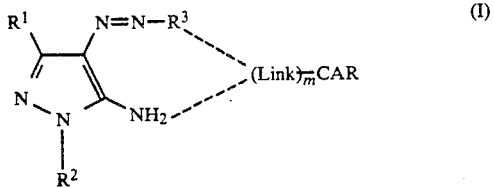

wherein CAR represents a carrier moiety which is capable of releasing a diffusible dye from the compound in correspondence or counter-correspondence to development under alkaline conditions; Link represents a group connecting CAR with a diffusible dye; m represents 0 or 1; the dotted lines mean that at least one of the dotted lines is a bond; $R^1$ represents a hydrogen atom, an alkyl group, an aryl group, an alkoxy group, an aryloxy group, an alkoxycarbonyl group, an aryloxycarbonyl group or a carbamoyl group; $R^2$ represents an alkyl group or an aryl group; and $R^3$ represents an aryl group excepting an aryl group having a Hammett's $\sigma_p$ value less than 0.01.

The yellow dye providing compound has a dye moiety whose transferability is high and whose hue is excellent and provides a stable yellow dye image which does not substantially change hue over a wide pH range

DETAILED DESCRIPTION OF THE INVENTION

The yellow dye providing compound represented by general formula (I) is explained in greater detail below.

$R^1$ represents a hydrogen atom, an alkyl group (including a substituted alkyl group, preferably having from 1 to 10 carbon atoms, for example, methyl, ethyl, sec-butyl, tert-octyl, benzyl, cyclohexyl, chloromethyl, dimethylaminomethyl, n-hexyl, trifluoromethyl, 3,3,3-trichloropropyl, or methoxycarbonylmethyl), an aryl group (including a substituted aryl group, for example, phenyl, naphthyl, 3-sulfophenyl, 4-methoxyphenyl, or 3-lauroylaminophenyl), an alkoxy group or aryloxy group (including a substituted alkoxy group and substituted aryloxy group, preferably having up to 10 carbon atoms, for example, methoxy, ethoxy, propoxy, benzyloxy, phenoxy, 4-methoxyphenoxy, 3-acetylaminophenoxy, 3-methoxycarbonylpropyloxy, or 2-trimethylammonioethoxy), an alkoxycarbonyl group or aryloxycarbonyl group (including a substituted alkoxycarbonyl group or substituted aryloxycarbonyl group, preferably having up to 10 carbon atoms, for example, methoxycarbonyl, ethoxycarbonyl, propoxycarbonyl, 2-methoxyethoxycarbonyl, phenoxycarbonyl, 4-cyanophenoxycarbonyl, or 2-chlorophenoxycarbonyl, or a carbamoyl group (preferably having up to 10 carbon atoms, for example, carbamoyl, methylcarbamoyl, diethylcarbamoyl, methylethylcarbamoyl, phenylcarbamoyl, 2,4,6-trichlorophenylcarbamoyl, N-ethyl-N-phenylcarbamoyl, or 3-methylsulfamoylphenyl-carbamoyl).

$R^2$ represents an alkyl group or an aryl group. When $R^2$ is not connected with $(Link)_m$-CAR, specific examples of the alkyl group and aryl group for $R^2$ are the same as those described for the alkyl group and aryl group represented by $R^1$.

$R^3$ represents an aryl group (including a substituted aryl group, but excepting an aryl group having a Hammett's $\sigma_p$ value less than 0.01). When $R^3$ is not connected with $(Link)_m$-CAR, specific examples of the aryl group for $R^3$ include phenyl, 2-pyridyl, 4-pyridyl, p-nitrophenyl, 4-nitro-2-thiazolyl, p-methylsulfonylphenyl, and 2-chloro-4-nitrophenyl.

The term "aryl group" as used herein means and includes an aromatic heterocyclic group as described above.

Link represents a group connecting the dye compound moiety with the CAR moiety in the dye providing compound, and is bonded to at least one of $R^2$ and $R^3$ m represents 0 or 1.

Link is a group having a large influence on the properties of the diffusible dye (for example, hue, diffusibility, mordanting property, or stability, etc.), or the properties of the dye providing compound per se (for example, solubility, diffusion-resistivity, stability, or facility of synthesis, etc.), or on the releasing speed of the diffusible dye. Link can be widely selected depending on the structures of the dye moiety and the CAR moiety.

Preferred structures of Link are described below together with $R^2$, $R^3$ and CAR.

In the general formula (I), $-R^2-(Link)_m-CAR$ or $-R^3(Link)_m-CAR$ is preferably represented by the following general formula:

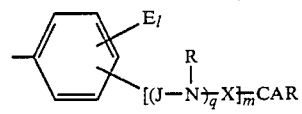

wherein X represents a divalent linking group of the formula $-R^4-L_n-R^4_p-$ (wherein $R^4$'s, which may be the same or different, each represents an alkylene group having from 1 to about 8 carbon atoms, a phenylene group or a substituted phenylene group having from 6 to about 9 carbon atoms; L represents a divalent group selected from an oxy group, a carbonyl group, a carboxamido group, a carbamoyl group, a sulfonamido group, a sulfamoyl group, a sulfinyl group or a sulfonyl group; n represents an integer of 0 or 1; and p represents 1 when n is 1, and p represents 1 or 0 when n is 0, provided that when p is 1, the number of carbon atoms included in both $R^4$ groups does not exceed 14 in total);

R represents a hydrogen atom or an alkyl group having from 1 to about 6 carbon atoms; J represents a divalent group selected from a sulfonyl group and a carbonyl group; m and q each represents an integer of 0 or 1; E represents a hydrogen atom, a chlorine atom, a bromine atom, a fluorine atom, an alkyl group having from 1 to about 4 carbon atoms, an alkoxy group having from 1 to about 4 carbon atoms, an aryl group having from 6 to about 10 carbon atoms, a cyano group, a trifluoromethyl group, a nitro group, an alkylsulfonyl group having from 1 to about 8 carbon atoms, a substituted alkylsulfinyl group having from 1 to about 8 carbon atoms wherein the substituent is selected from a hydroxyl group, a phenyl group, a cyano group, a sulfamoyl group, a carboxyl group and a sulfo group, a phenylsulfonyl group, a substituted phenylsulfonyl group substituted with a carboxyl group, a hydroxyl group, a sulfamoyl group and a sulfo group, a carboxylic acid ester group having the formula —COOR$^5$ (wherein R$^5$ represents an alkyl group having from 1 to about 18 carbon atoms, a phenyl group, a substituted phenyl group wherein the substituent is a chlorine atom or a nitro group), a sulfo group, a sulfamoyl group having the formula —SO$_2$NR$^6$R$^7$ (wherein R$^6$ represents a hydrogen atom or an alkyl group having from 1 to about 6 carbon atoms; and R$^7$ represents a hydrogen atom, an alkyl group having from 1 to about 6 carbon atoms, a substituted alkyl group having from 1 to about 6 carbon atoms which is substituted with a hydroxyl group, a cyano group, a fluorosulfonyl group, a carboxyl group or a sulfo group, a benzyl group, a phenyl group, a substituted phenyl group which is substituted with a hydroxyl group, a sulfonyl group, a sulfamoyl group, a carboxyl group or a sulfo group, an alkylcarbonyl group having from 1 to about 8 carbon atoms, or a phenylcarbonyl group having from 6 to about 9 carbon atoms, provided that the number of carbon atoms included in both R$^6$ and R$^7$ does not exceed 14 in total), a carbamoyl group having the formula —CON(R$^6$)$_2$ (wherein R$^6$'s, which may be the same or different, each represents a hydrogen atom or an alkyl group having from 1 to about 6 carbon atoms), or a carboxyl group.

When R$^3$ is connected to (Link)$_m$—CAR, E is selected from the above described substituents so that the Hammett's $\sigma_p$ value of E is 0 or more.

Now, CAR will be described in greater detail below.

CAR represents a ballasted carrier moiety which is substantially diffusion-resistant and is capable of releasing a diffusible dye from the dye providing compound represented by general formula (I) in correspondence or counter-correspondence to development under alkaline conditions, that is, a redox mother skeleton moiety.

As described above, CAR is mainly divided into that of negative acting moieties (which releases a dye in correspondence to development) and that of positive acting moieties (which releases a dye in counter-correspondence to development). Any of these CAR's as above described as mother skeletons may be employed in the present invention. CAR can be appropriately selected depending on the use, construction of the light-sensitive element or the structure of the dye moiety.

More specifically, in one embodiment CAR is selected so that the compound represented by the general formula (I) is a non-diffusible image forming compound which is oxidized as a result of development, thereby undergoing self-cleavage and releasing a diffusible dye.

An example of CAR which is effective for compounds of this type is an N-substituted sulfamoyl group.

For example, a group represented by the following general formula (YI) is illustrated for CAR:

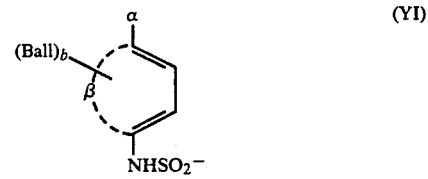

wherein $\beta$ represents a nonmetallic atomic group necessary for forming a benzene ring, which may optionally be fused with a carbon ring or a hetero ring to form, for example, a naphthalene ring, a quinoline ring, a 5,6,7,8-tetrahydronaphthalene ring, or a chroman ring; $\alpha$ represents a group of —OG$^{11}$ or —NHG$^{12}$ (wherein G$^{11}$ represents a hydrogen atom or a group which forms a hydroxyl group upon being hydrolyzed, and G$^{12}$ represents a hydrogen atom, an alkyl group containing from 1 to 22 carbon atoms or a hydrolyzable group); Ball represents a ballast group; and b represents an integer of 0, 1 or 2.

Specific examples of this type of CAR are described in JP-A-48-33826 and JP-A-53-50736.

Other examples of CAR suited for this type of compound are those represented by the following general formula (YII):

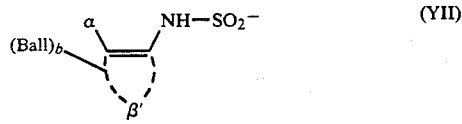

wherein Ball, $\alpha$ and b each has the same meaning as defined in general formula (YI), $\beta'$ represents an atomic group necessary for forming a carbon ring such as, for example, a benzene ring which may be fused with another carbon ring or a hetero ring to form a naphthalene ring, a quinoline ring, a 5,6,7,8-tetrahydronaphthalene ring, or a chroman ring. Specific examples of this type of CAR are described in U.S. Pat. No. 4,055,428, JP-A-56-12642, JP-A-56-16130, U.S. Patent 4,336,322, JP-A-57-4043, JP-A-57-650, and U.S. Patent 4,053,312.

Further examples of CAR suited for this type of compound are those represented by the following general formula (YIII):

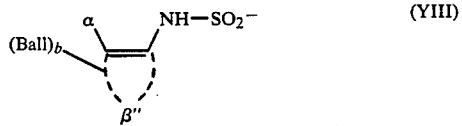

wherein Ball, $\alpha$ and b each has the same meaning as defined in general formula (YI), and $\beta''$ represents an atomic group necessary for forming a hetero ring, for example, a pyrazole ring or a pyridine ring, the hetero ring being optionally fused with a carbon ring or a hetero ring. Specific examples of this type of CAR are described in JP-A-51-104343.

Still further examples of CAR suited for this type of compound are those represented by the following general formula (YIV):

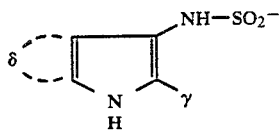

wherein γ preferably represents a hydrogen atom, a substituted or unsubstituted alkyl, aryl or heterocyclic group, or —CO—$G^{21}$; $G^{21}$ represents —$OG^{22}$, —$SG^{22}$ or

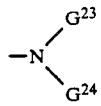

(wherein $G^{22}$ represents a hydrogen atom, an alkyl group, a cycloalkyl group or an aryl group, $G^{23}$ is the same as defined for $G^{22}$ above, or $G^{23}$ represents an acyl group derived from an aliphatic or aromatic carboxylic or sulfonic acid, and $G^{24}$ represents a hydrogen atom or an unsubstituted or substituted alkyl group); and δ represents a residue necessary for completing a fused benzene ring.

Specific examples of this type of CAR are described in U.S. Pat. Nos. 4,198,235, 4,179,291 and 4,273,855, and British Patent 2,090,990A.

Still further examples of CAR suited for this type of compound are those represented by the following general formula (YV):

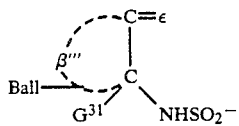

Ball has the same meaning as defined in the general formula (YI); ε represents an oxygen atom or =$HG^{32}$ (wherein $G^{32}$ represents a hydroxyl group or an optionally substituted amino group; examples of $H_2N$—$G^{32}$ to be used for forming the =$NG^{32}$ group include hydroxylamines, hydrazines, semicarbazides, and thiosemicarbazides); β''' represents an atomic group necessary for forming a saturated or unsaturated non aromatic 5-membered, 6-membered or 7-membered hydrocarbon ring; and $G^{31}$ represents a hydrogen atom or a halogen atom (for example, fluorine, chlorine or bromine).

Specific examples of this type of CAR are described in U.S. Pat. No. 4,149,829 and JP-A-54-48534.

Other examples of CAR suited for this type of compound are described, for example, in U.S. Pat. Nos. 3,493,939, 3,628,952, 3,443,934 and 3,844,785.

Still further examples of CAR are those represented by the following general formula (YVI):

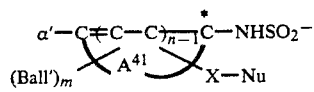

wherein α' represents $OR^{41}$ or $NHR^{42}$; $R^{41}$ represents a hydrogen atom or a hydrolyzable component; $R^{42}$ represents a hydrogen atom, an alkyl group containing from 1 to 50 carbon atoms or a hydrolyzable group; A41 represents an atomic group necessary for forming an aromatic ring; Ball' represents an organic immobilizing group present on the aromatic ring; m represents an integer of 1 or 2, when m is 2, the Ball's may be the same or different; X represents a divalent organic group having from 1 to 8 carbon atoms, with the nucleophilic group (Nu) and an electrophilic center (asterisked carbon atom) formed by oxidation forming a 5-membered to 12-membered ring; Nu represents a nucleophilic group; and n represents an integer of 1 or 2. Specific examples of this type of CAR are described in JP-A-57-20735.

As still further types of compounds represented by the general formula (I), there are non-diffusible image forming compounds which release a diffusible dye in the presence of a base as a result of self cyclization or the like but which, when reacted with an oxidation product of a developing agent, substantially never release the dye.

Examples of CAR effective for this type of compound are those which are represented by the following general formula (YVII):

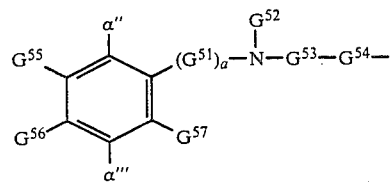

wherein α'' represents an oxidizable nucleophilic group (for example, a hydroxyl group, a primary or secondary amino group, a hydroxylamino group, or a sulfonamido group) or a precursor thereof; α''' represents a dialkylamino group or any one of the groups defined for α''; $G^{51}$ represents an alkylene group having from 1 to 3 carbon atoms; a represents 0 or 1; $G^{52}$ represents a substituted or unsubstituted alkyl group having from 1 to 40 carbon atoms or a substituted or unsubstituted aryl group having from 6 to 40 carbon atoms; $G^{53}$ represents an electrophilic group such as —CO— or —CS—; $G^{54}$ represents an oxygen atom, a sulfur atom, a selenium atom, or a nitrogen atom, and when $G^{54}$ represents a nitrogen atom, it has bonded thereto a hydrogen atom or may be substituted with an alkyl group or a substituted alkyl group having from 1 to 10 carbon atoms or an aromatic residue having from 6 to 20 carbon atoms; $G^{55}$, $G^{56}$ and $G^{57}$ each represents a hydrogen atom, a halogen atom, a carbonyl group, a sulfamyl group, a sulfonamido group, an alkoxy group having from 1 to 40 carbon atoms or any of the groups defined for $G^{52}$, or $G^{55}$ and $G^{56}$ may together form a 5-membered to 7-membered ring, or $G^{56}$ may represent

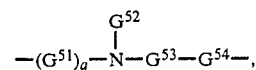

with the proviso that at least one of $G^{52}$, $G^{55}$, $G^{56}$, and $G^{57}$ represents a ballast group. Specific examples of this type of CAR are described in U.S. Pat. No. 4,108,850.

Further examples of CAR suited for this type of compound are those which are represented by the following general formulae (YVIII) and (YIX):

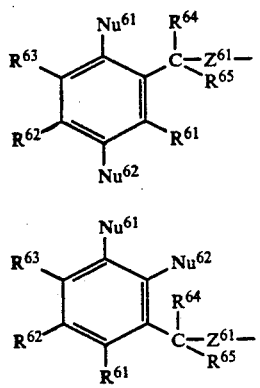

(YVIII)

(YIX)

wherein $Nu^{61}$ and $Nu^{62}$, which may be the same or different, each represents a nucleophilic group or a precursor thereof; $Z^{61}$ represents a divalent atom group which is electrically negative with respect to the carbon atom substituted by $R^{64}$ and $R^{65}$; $R^{61}$, $R^{62}$ and $R^{63}$, which may be the same or different, each represents a hydrogen atom, a halogen atom, an alkyl groups an alkoxy group or an acylamino group or, when located at adjacent positions on the ring, $R^{61}$ and $R^{62}$ may form a fused ring together with the rest of the molecule, or $R^{62}$ and $R^{63}$ may form a fused ring together with the rest of the molecule; $R^{64}$ and $R^{65}$, which may be the same or different, each represents a hydrogen atom, a hydrocarbon group or a substituted hydrocarbon group; with at least one of the substituents, $R^{61}$, $R^{62}$, $R^{63}$, $R^{64}$ and $R^{65}$ having a ballast group, Ball, of an enough size so as to render the above-described compounds immobile. Specific examples of this type of CAR are described in British Patent 1,593,669 and U.S. Pat. No. 4,232,107.

Further examples of CAR suited for this type of compound are those which are represented by the following general formula (YX):

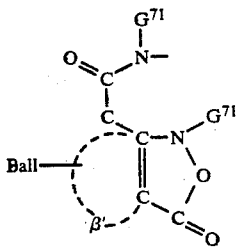

(YX)

wherein Ball and $\beta'$ each has the same meaning as defined in the general formula (YII), and $G^{71}$ represents an alkyl group (including a substituted alkyl group). Specific examples of this type of CAR are described in U.S. Pat. Nos. 3,928,678 and 4,199,355.

As a different type of compound represented by the general formula (I), there are illustrated non-diffusible image forming compounds which themselves do not release any dye but, upon reaction with a reducing agent, release a dye. With these compounds, compounds which mediate the redox reaction (called electron donors) are preferably used in combination therewith.

Examples of CAR effective for this type of compound are those represented by the following general formula (YXI):

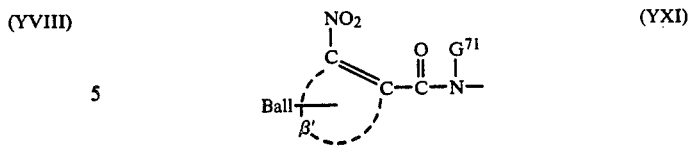

(YXI)

wherein Ball and $\beta'$ each has the same meaning as defined in the general formula (YII), and $G^{71}$ represents an alkyl group (including a substituted alkyl group). Specific examples of this type of CAR are described in U.S. Pat. Nos. 4,142,891, 4,139,379 and 4,218,368.

Further examples of CAR suited for this type of compound are those which are represented by the following general formula (YXII):

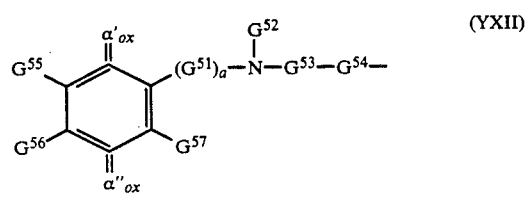

(YXII)

wherein $\alpha'_{ox}$ and $\alpha''_{ox}$ are each defined in U.S. Pat. Nos. 4,139,379, 4,356,249 and 4,358,525, and $G^{51}$, $G^{52}$, $G^{53}$, $G^{54}$, $G^{55}$, $G^{56}$, $G^{57}$ and a have the same meaning as in formula (YVII).

Specific examples of the type of CAR are described in U.S. Pat. Nos. 4,139,379, 4,356,249 and 4,358,525.

Further examples of CAR suited for this type of compound are those which are represented by the following general formulae (YXIIIA) and (YXIIIB):

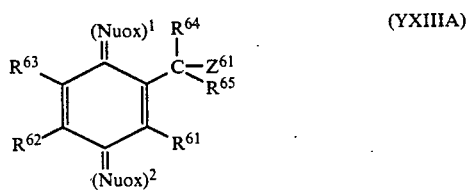

(YXIIIA)

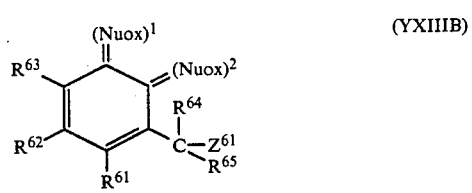

(YXIIIB)

wherein $(Nuox)^1$ and $(Nuox)^2$, which may be the same or different, each represents an oxidized nucleophilic group, and the other notations each have the same meaning as defined in the general formulae (YVIII) and (YIX).

Specific examples of these types of CAR are described in U.S. Pat. Nos. 4,232,107 and 4,371,684.

The patents referred to with respect to the compounds of the general formulae (YXI), (YXII), (YXIIIA) and (YXIIIB) also describe electron donors to be used in combination therewith.

Furthermore, more preferred examples of CAR include compounds containing both an N—X group (wherein X represents an oxygen atom, a sulfur atom or a nitrogen atom) and an electron withdrawing group in their molecule as described, for example, in European Patent 220,746A2, U.S. Pat. No. 4,783,396, Kokai Giho 87-6199, JP-A-63-201653 and JP-A-63-201654; compounds containing both an SO₂'X group (wherein X has the same meaning as defined above) and an electron withdrawing group in their molecule as described, for example, in JP-A-1-26842; compounds containing both a PO—X group (wherein X has the same meaning as defined above) and an electron withdrawing group in their molecule as described, for example, in JP-A-63-271344; and compounds containing both a C—X' group (wherein X' has the same meaning as that defined above for X or represents —S₂—) and an electron withdrawing group in their molecule as described, for example, in JP-A-63-271341.

Particularly preferred compounds represented by the general formula (I) are those wherein CAR is a group represented by the general formula (YXIV):

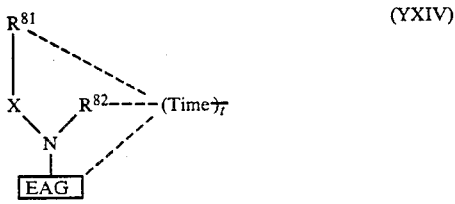

(YXIV)

wherein EAG represents a group which accepts an electron from a reducing substance; R⁸¹ and R⁸² each represents a substituent other than a hydrogen atom, and when R⁸¹ or R⁸² is bonded to ─(Time)$_t$, R⁸¹ or R⁸² is a chemical bond or a substituent other than a hydrogen atom, or R⁸¹ and R⁸² may combine with each other to form a ring; X represents —O—, —S— or

(wherein R⁶ represents a hydrogen atom or an alkyl group having from 1 to about 6 carbon atoms), —O— being most preferred; Time represents a group capable of releasing Dye via a subsequent reaction triggered by the cleavage of the N—X single bond, such as the nitrogen-oxygen single bond, in the moiety represented by the general formula (YXIV); t represents 0 or 1; the solid lines each represents a bond, and the dotted lines mean that at least one of the dotted lines is a bond.

Specific examples of this type of CAR are described in U.S. Pat. No. 4,783,396. Among them, those represented by the general formula (YXV) are particularly preferably employed in the present invention:

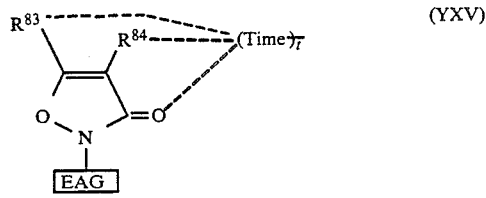

(YXV)

wherein R⁸³ and R⁸⁴ each represents a simple bond, hydrogen atom or a group which may have a substituent, or R⁸³ and R⁸⁴ may combine with each other to form a saturated or unsaturated carbon ring or hetero ring; and EAG, Time and t each has the same meaning as defined in the general formula (YXIV).

It is preferred that the moieties represented by the general formulae (YXIV) or (YXV) have a ballast group in at least one group represented by R⁸¹, R⁸², R⁸³, R⁸⁴ or EAG.

The ballast group used in tee general formulae (YI) to (YXV) is an organic ballast group which can render the dye image forming compound represented by the general formula (I) nondiffusible, and is preferably a group containing a hydrophobic group having from 8 to 32 carbon atoms. Such an organic ballast group is connected to the dye image forming compound directly or through a linking group (for example, an imino bond, an ether bond, a thioether bond, a carbonamido bond, a sulfonamido bond, a ureido bond, an ester bond, a carbamoyl bond, a sulfamoyl bond, or a combination thereof).

Specific examples of the compounds represented by the general formula (I) are set forth below, but the present invention should not be construed as being limited thereto.

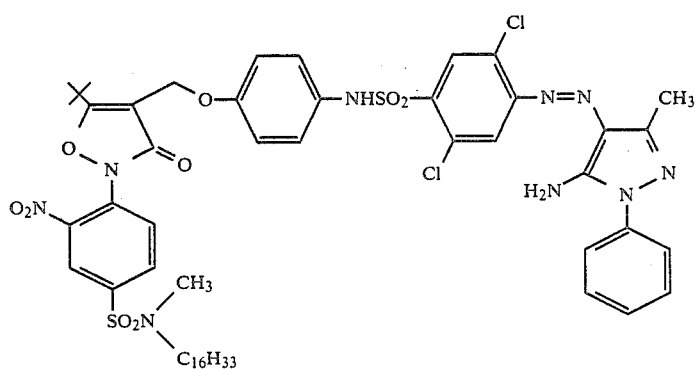

1.

-continued
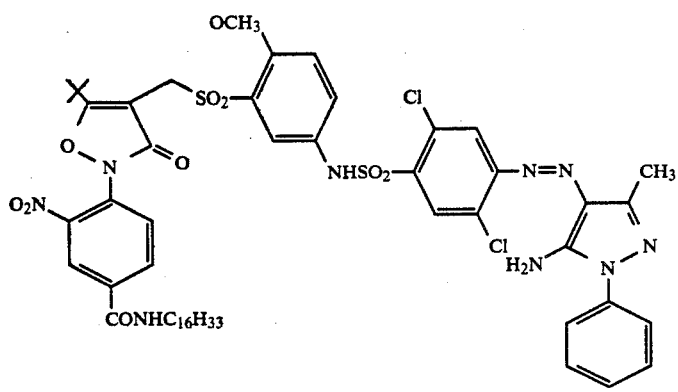
2.
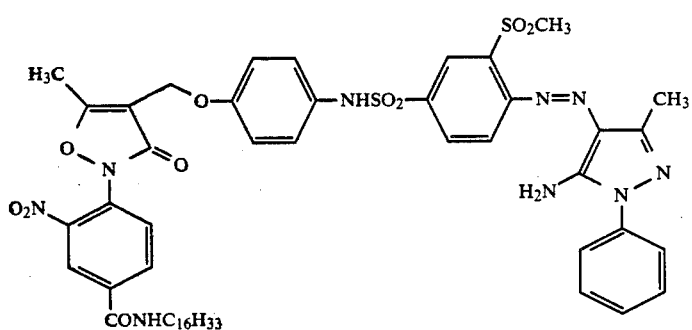
3.
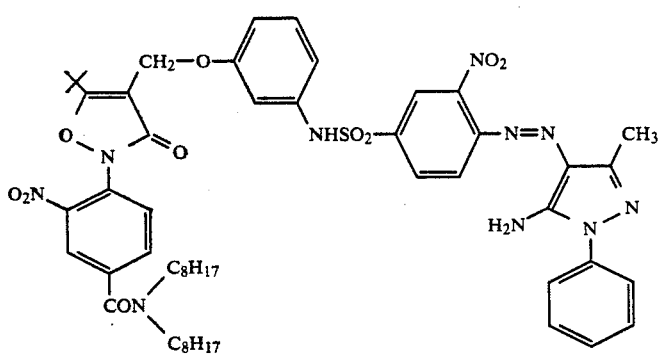
4.
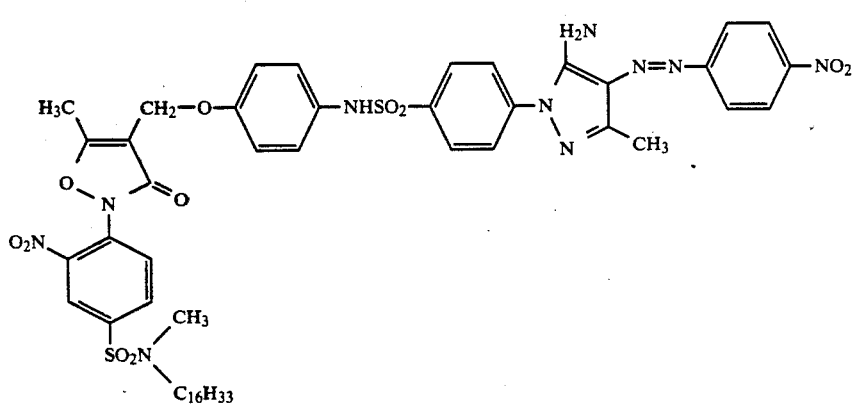
5.

-continued
6.
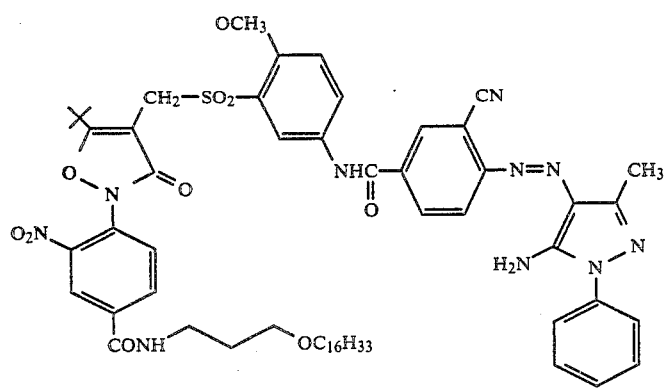
7.
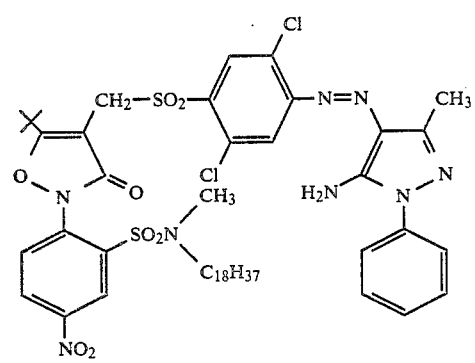
8.
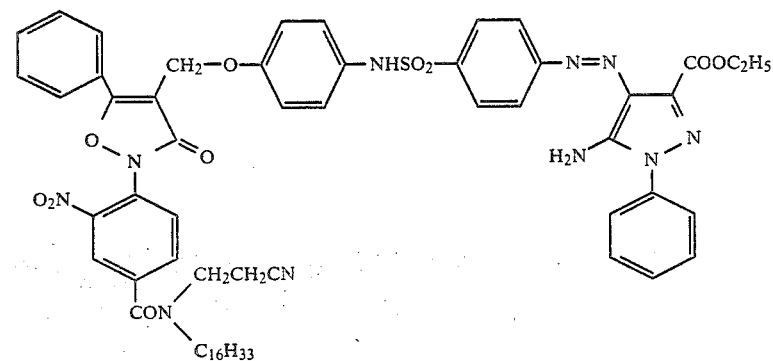
9.
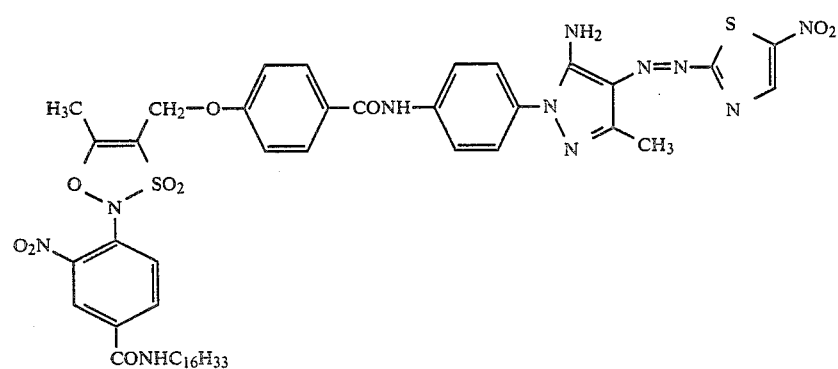

-continued
10.
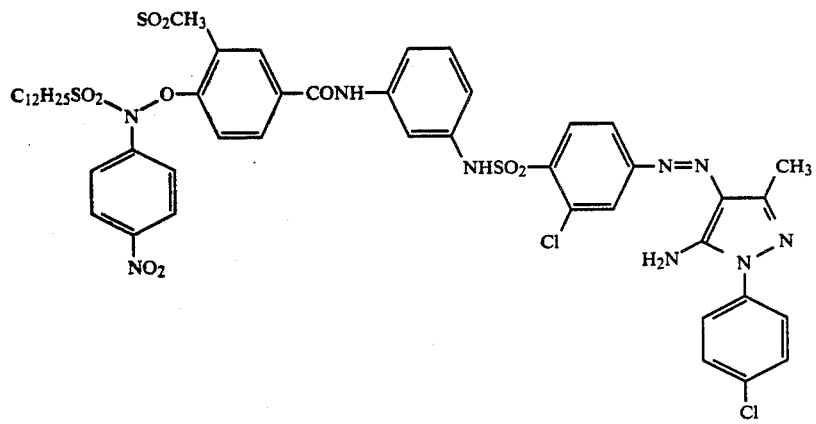
11.
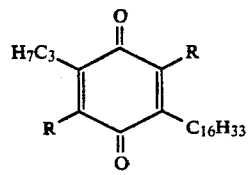
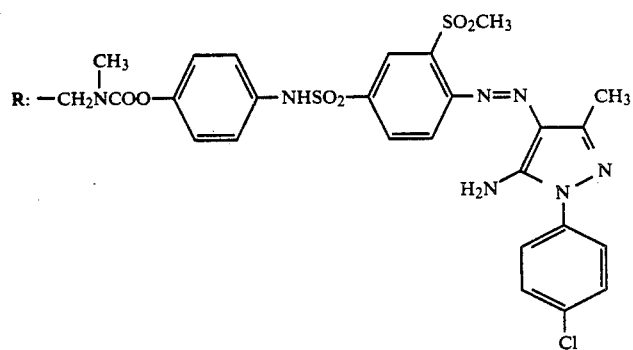
12.
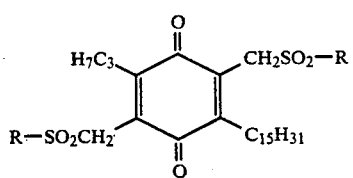
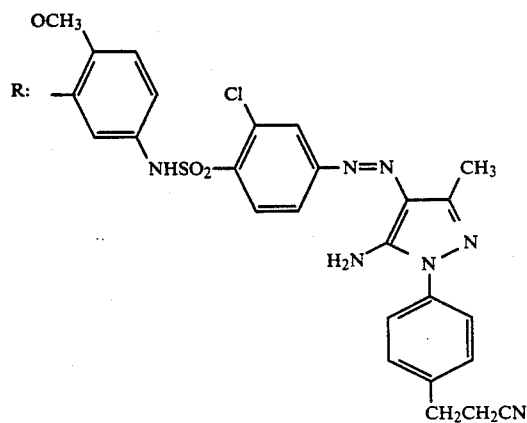

13.
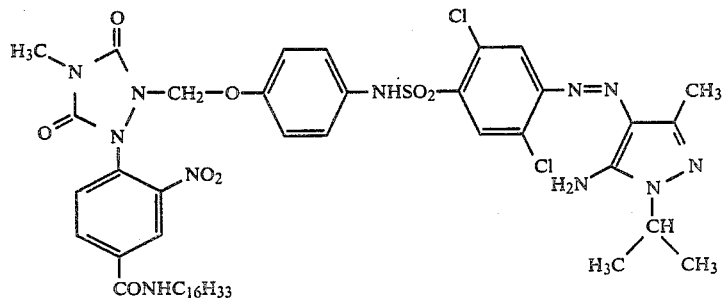
14.
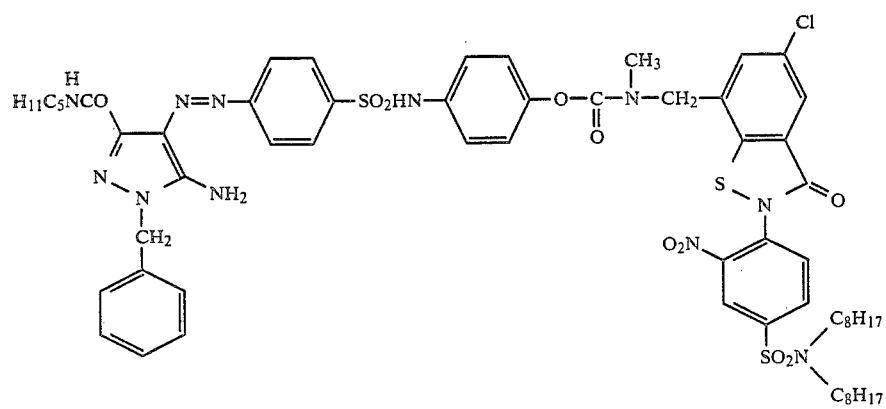
15.
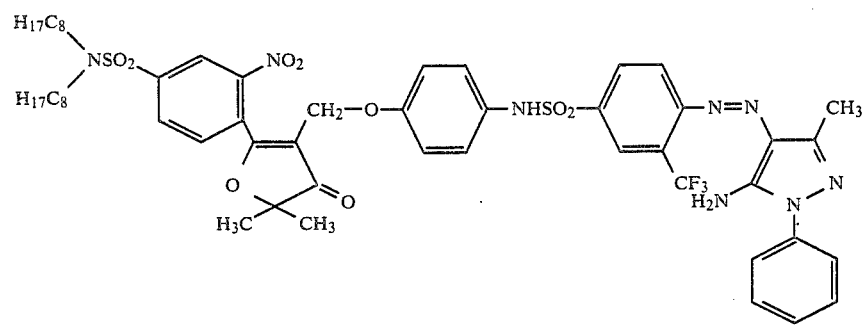
16.
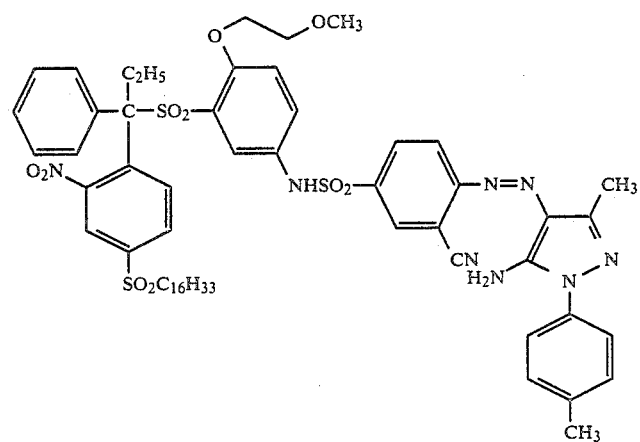

-continued
17.
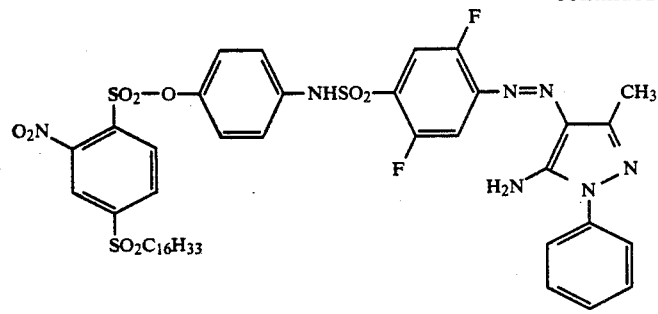
18.
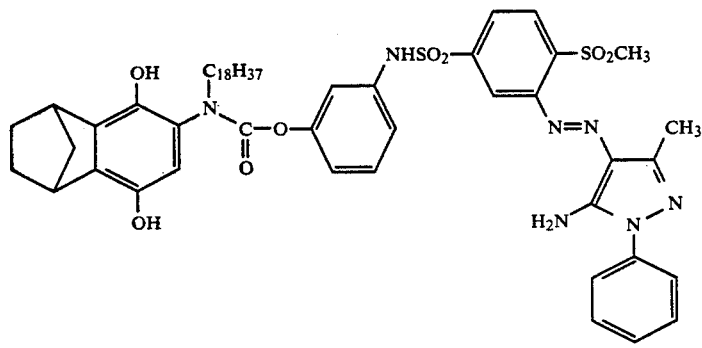
19.
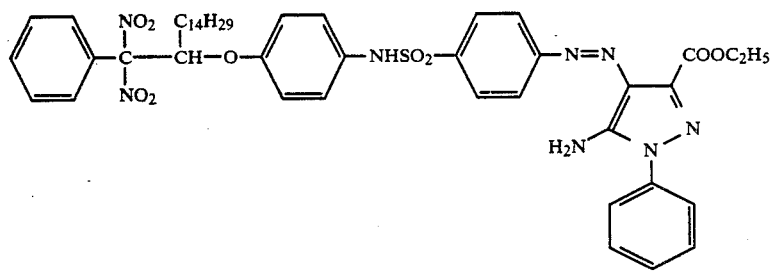
20.
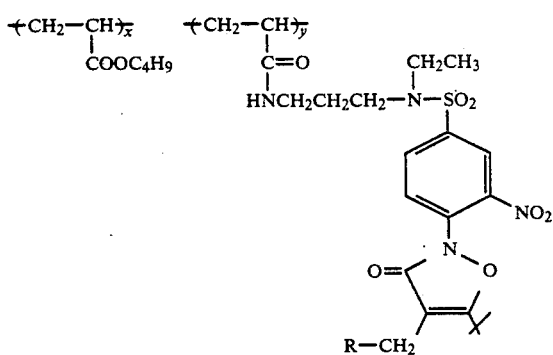
x/y = 50/50 (wt/wt)
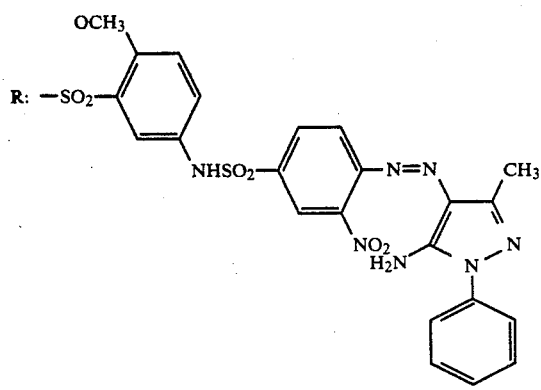

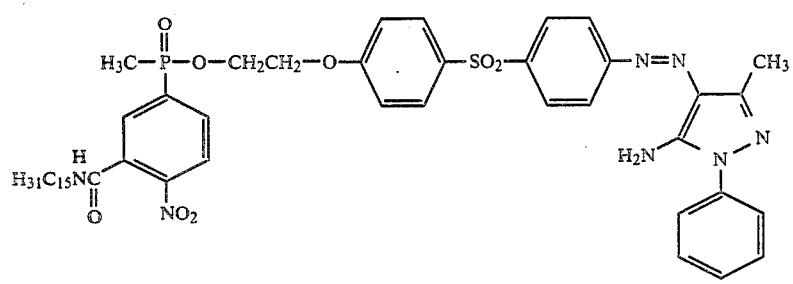
21.
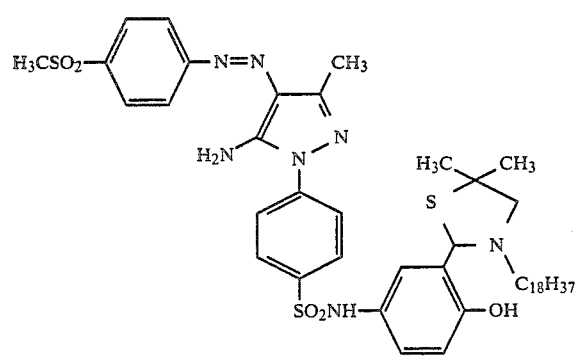
22.
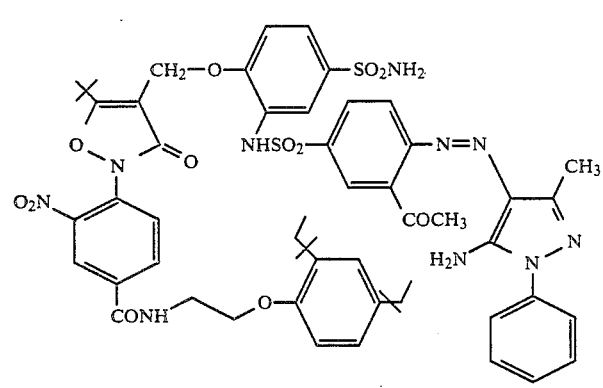
23.
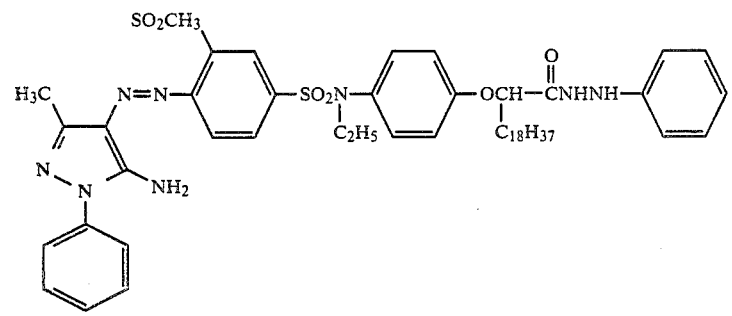
24.
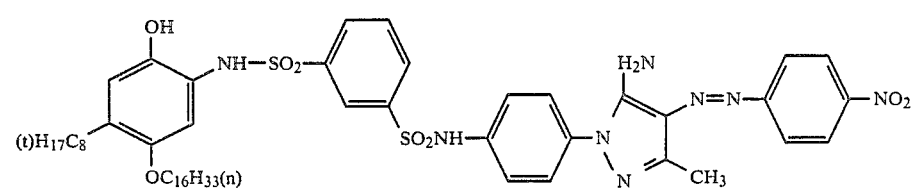
25.

-continued
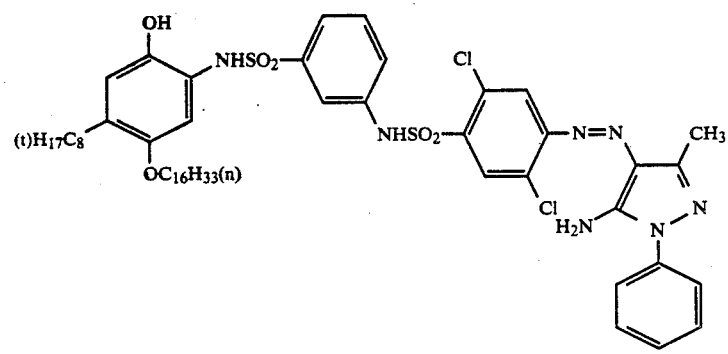 26.
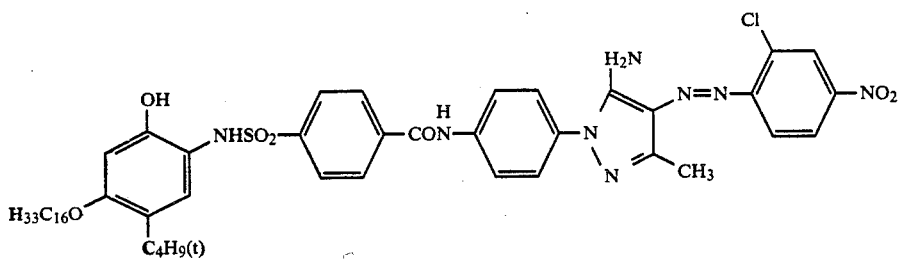 27.
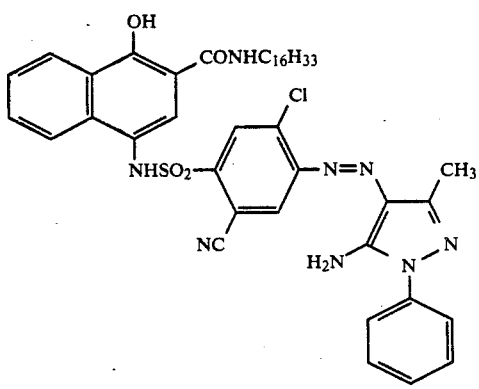 28.
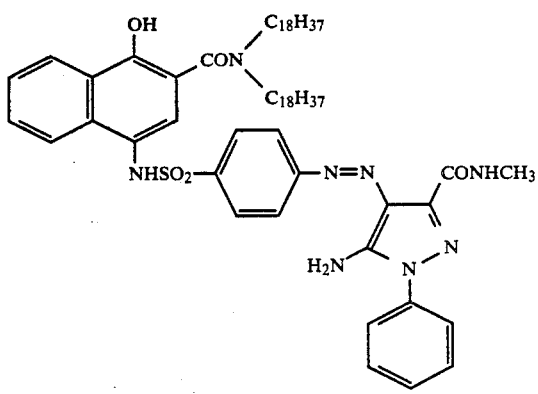 29.

-continued
30.
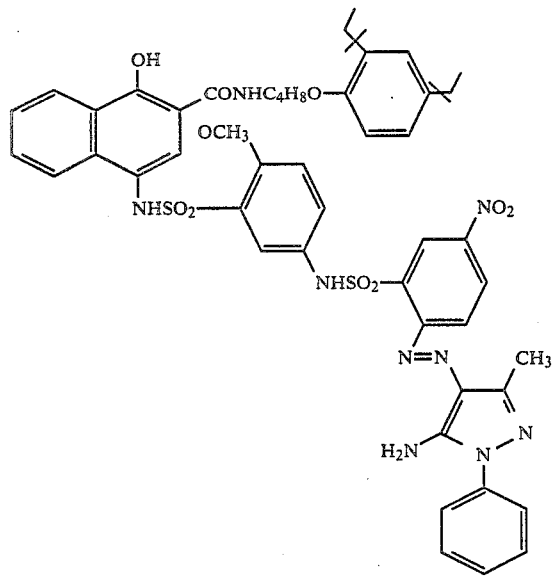
31.
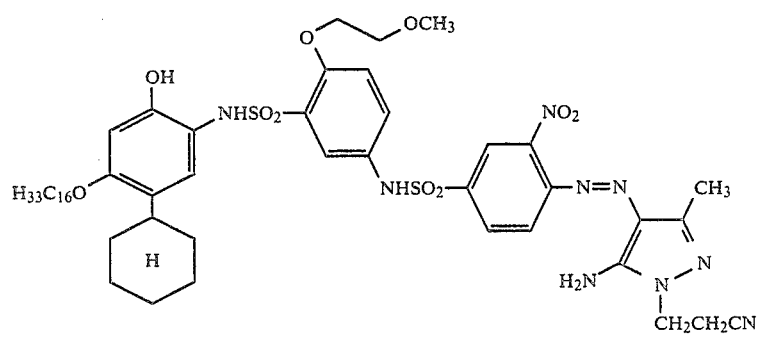
32.
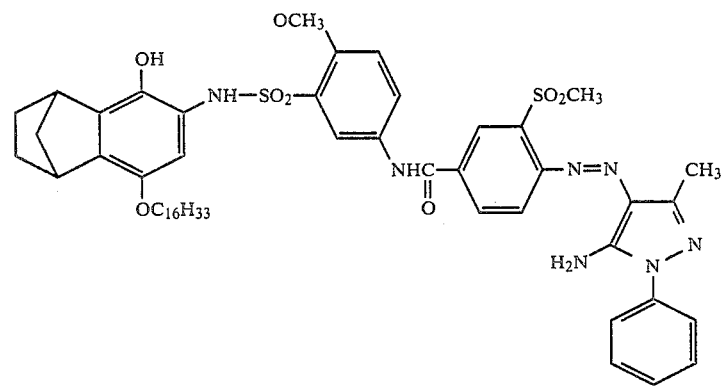
33.
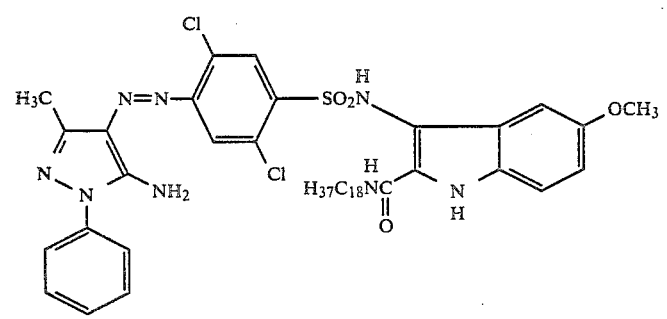

-continued
34.
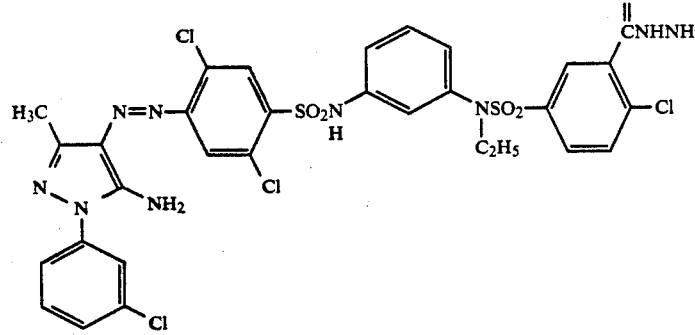
35.
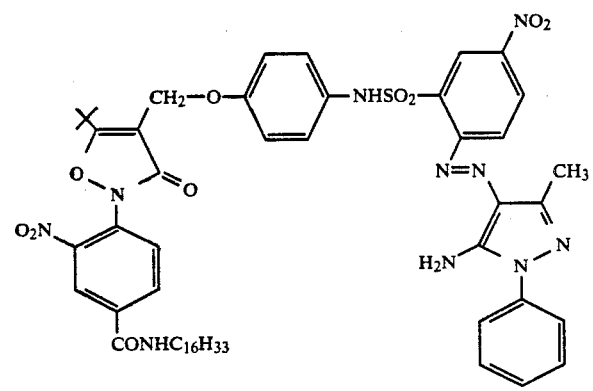
36.
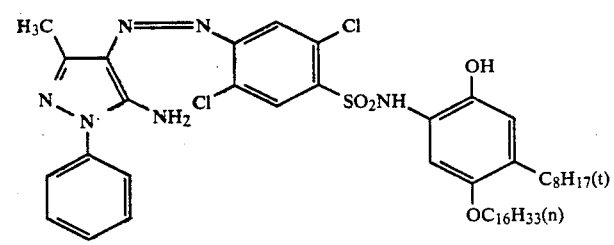
37.
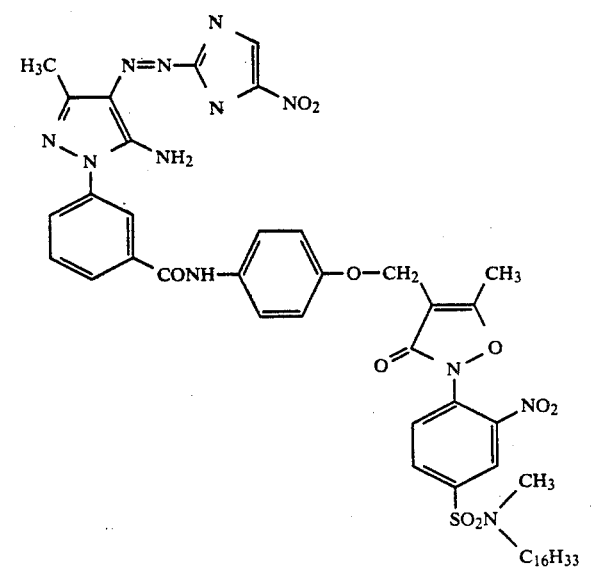
A synthesis example of the compound according to the present invention is specifically illustrated below.
SYNTHESIS EXAMPLE
Synthesis of Compound 1
8.6 g of Compound A* shown below was dissolved in 50 ml of dimethylacetamide and to the solution was added dropwise 3 ml of pyridine under cooling with ice. After stirring at 0° C for 10 minutes, 5.0 g of 5-amino-4-(4-chlorosulfonyl-2,5-dichlorophenylazo)-3-methyl-1-phenylpyrazole was added thereto in the form of powder and the mixture was stirred at room temperature for 5 hours. After completion of the reaction, the reaction mixture was poured into dilute hydrochloric acid and extracted with ethyl acetate. The extract was washed with dilute hydrochloric acid and then with water, and dried. The ethyl acetate was distilled off under a reduced pressure, and the residue was purified by silica gel chromatography. The desired compound obtained from the eluate of solvent mixture of ethyl acetate and hexane (5:1 by volume) was recrystallized from a solvent mixture of acetone and methanol (1:3 by volume), whereby 10.5 g (yield: 84.6%) of Compound 1 was obtained.

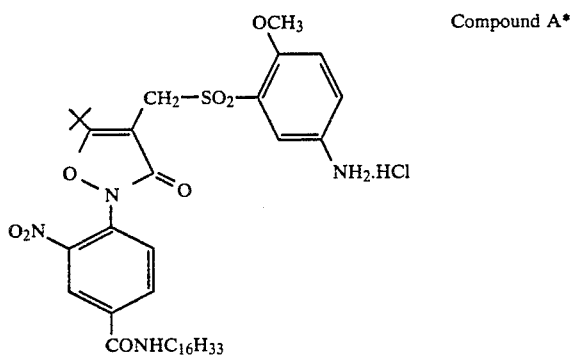

Compound A*

The image forming compound according to the present invention can be employed individually or may be employed together with a reducing substance which is capable of reducing exposed silver halide and conducting cross-oxidation with the compound according to the present invention. As the reducing substances, while various compounds can be employed, hydroquinones, 3-pyrazolidones, aminophenols, catechols, p-phenylenediamines, aminonaphthols, and reductones are preferred.

Further, precursors which form reducing compounds as described above by hydrolysis under an alkaline condition may also be employed. Suitable examples thereof are described, for example, in JP-A-55-52055, JP-B-54-39727 (the term "JP-B" as used herein refers to an "examined Japanese patent publication") and JP-A-57-135949.

Specific examples of more preferred reducing compounds include the following compounds: 3-pyrazolidones (for example, 1-phenyl-3-pyrazolidone, 1-phenyl-4,4-dimethyl-3-pyrazolidone, 4-hydroxymethyl-4-methyl-1-phenyl-3-pyrazolidone, 1-m-tolyl-3-pyrazolidone, 1-p-tolyl-3-pyrazolidone, 1-phenyl 4-methyl-3-pyrazolidone, 1-phenyl-5-methyl-3-pyrazolidone, 1-phenyl 4,4-bis-(hydroxymethyl)-3-pyrazolidone, 1,4-dimethyl-3-pyrazolidone, 4-methyl-3-pyrazolidone, 4,4-dimethyl-3-pyrazolidone, 1-(3-chlorophenyl)-4-methyl-3-pyrazolidone, 1-(4-chlorophenyl)-4-methyl-3-pyrazolidone, 1-(4-tolyl)-4-methyl-3-pyrazolidone, 1-(2-tolyl)-4-methyl 3-pyrazolidone, 1-(4-tolyl)-3-pyrazolidone, 1-(3-tolyl)-3-pyrazolidone, 1-(3-tolyl)-4,4-dimethyl 3-pyrazolidone, 1-(2-trifluoroethyl)-4,4-dimethyl-3-pyrazolidone, 5-methyl-3-pyrazolidone, 1,5-diphenyl-3-pyrazolidone, 1-phenyl-4-methyl-4-stearoyloxymethyl-3-pyrazolidone, 1-phenyl-4-methyl-4-lauroyloxymethyl-3-pyrazolidone, 1-phenyl-4,4-bis-(lauroyloxymehtyl)-3-pyrazolidone, 1-phenyl-2-acetyl-3-pyrazolidone, and 1-phenyl-3 acetoxypyrazolidone); hydroquinones (for example, hydroquinone, toluhydroquinone, 2,6-dimethylhydroquinone, tert-butylhydroquinone, 2,5-di-tert-butylhydroquinone, tert-octylhydroquinone, 2,5-di-tert-octylhydroquinone, pentadecylhydroquinone, sodium 5-pentadecylhydroquinone 2-sulfonate, p-benzoyloxyphenol, 2-methyl-4-benzoyloxyphenol, and 2-tert butyl-4-(4-chlorobenzoyloxyphenol)); aminophenols (for example, 4-amino-2,6-dichlorophenol, 4-amino-2,6-dibromophenol, 4-amino-2-methylphenol sulfate, 4-amino-3-methylphenol sulfate, 4-amino-2,6-dichlorophenol hydrochloride, p-aminophenol, p-methylaminophenol, p-dimethylaminophenol, p-diethylaminophenol, p-dibutylaminophenol, p-piperidinoaminophenol, and 4-dimethylamino-2,6-dimethoxyphenol); phenylenediamines (for example, N methyl-p-phenylenediamine, N,N-dimethyl-p-phenylenediamine, N,N-diethyl-p phenylenediamine, N,N,N',N'-tetramethyl-p-phenylenediamine, and 4-diethylamino-2,6-dimethoxyaniline), and reductones (for example, piperidinohexose reductone and pyrrolidinohexose reductone).

Moreover, 2,6-dichloro-4-substituted sulfonamidophenols and 2,6-dibromo-4 substituted sulfonamidophenols as described in Research Disclosure, Vol. 151, No. 15108 and U.S. Pat. No. 4,021,240; and p-(N,N-dialkylaminophenol)sulfamines as described in JP-A-59-116740 are also useful.

In addition to the phenolic reducing agents described above, naphtholic reducing agents, for example, 4-aminonaphthol derivatives and 4-substituted sulfonamidonaphthol derivatives are useful.

These reducing substances and precursors thereof can be employed individually or in combination of two or more thereof.

The silver halide which can be used in the present invention may include any of silver chloride, silver bromide, silver iodide, silver chlorobromide, silver chloroiodide, silver iodobromide, and silver chloroiodobromide.

The halogen composition in the silver halide grains may be uniform, or the silver halide grains may have a multiple structure in which the composition is different between a surface portion and an interior portion (as described, for example, in JP-A-57-154232, JP-A-58-108533, JP-A-59-48755, JP-A-59-52237, U.S. Pat. No. 4,433,048 and European Patent 100,984).

Also, a tabular grain silver halide emulsion containing grains having a thickness of 0.5 μm or less, a diameter of at least 0.6 μm and an average aspect ratio of 5 or more (see, for example, U.S. Pat. Nos. 4,414,310 and 4,435,499, and West German Patent Application (OLS) No. 3,241,646A1), or a monodispersed emulsion having a nearly uniform distribution of grain size (see, for example, JP-A-57-178235, JP-A-58-100846, JP-A-58-14829, PCT Application (OPI) No. 83/02338A1, and European Patents 64,412A3 and 83,377A1) may be used in the present invention.

Two or more kinds of silver halides in which the crystal habit, the halogen composition, the grain size and/or the distribution of grain size, etc., are different from each other may be used in admixture. Further, two or more kinds of monodispersed emulsions having a different grain size from each other may be employed as a mixture to control gradation.

The average grain size of the silver halide used in the present invention is preferably from 0.001 µm to 10 µm, and more preferably from 0.001 µm to 5 µm.

The silver halide emulsions can be prepared by any of an acid process, a neutral process, or an ammonia process. Further, the reaction system of soluble silver salts and soluble halogen salts may be employed in any of a single jet process, a double jet process, or a combination thereof. In addition, a reverse mixing process in which silver halide grains are formed in the presence of an excess of silver ions, or a controlled double jet process in which the pAg in the liquid phase is kept constant, can also be utilized.

Moreover, for the purpose of increasing growth of grains, the concentration of addition, the amount of addition and/or speed of addition of silver salts and halogen salts added may be increased (as described, for example JP A 55-142329, JP-A-55-158124, and U.S. Pat. No. 3,650,757).

Furthermore, silver halide grains of epitaxial junction type (see, for example, JP-A-56-16124 and U.S. Pat. No. 4,094,684) may be employed.

In the step for formation of silver halide grains used in the present invention, ammonia, an organic thioether derivative as described in JP-B-47-11386, or a compound containing sulfur as described in JP-A-53-144319, etc., can be used as a silver halide solvent.

In the process of the formation or physical ripening of silver halide grains, a cadmium salt, a zinc salt, a lead salt, or a thallium salt, etc., may be present.

Further, for the purpose of preventing high intensity reciprocity failure or low intensity reciprocity failure, a water-soluble iridium salt such as iridium (III or IV) chloride, or ammonium hexachloroiridate or a water-soluble rhodium salt such as rhodium chloride can be used.

Soluble salts may be removed from the silver halide emulsion after precipitate formation or physical ripening, and a noodle washing process or a flocculation process can be used for this purpose.

While the silver halide emulsion may be employed without being subjected to after-ripening, it is usually chemically sensitized. For the chemical sensitization, a sulfur sensitization method, a reduction sensitization method, and a noble metal sensitization method, which are known in the field for conventional type photographic light-sensitive materials, can be applied alone or in combination. Such a chemical sensitization may be carried out in the presence of a nitrogen-containing heterocyclic compound (see, for example, JP-A-58-126526 and JP-A-58-215644).

The silver halide emulsion used in the present invention can be that of a surface latent image type in which a latent image is formed mainly on the surface of grains, or that of an internal latent image type in which a latent image is formed mainly in the interior of grains. Further, a direct reversal emulsion in which an internal latent image type emulsion and a nucleating agent and/or light fogging are used in combination may be used. Examples of the internal latent image type emulsions suitable for this purpose are described, for example, in U.S. Pat. Nos. 2,592,250 and 3,761,276, JP-B-58-3534 and JP-A-57-136641. Preferred examples of the nucleating agents used in the present invention are described, for example, in U.S. Pat. Nos. 3,227,552, 4,245,037, 4,255,511, 4,266,031 and 4,276,364, and West German Patent Application (OLS) No. 2,635,316. With respect to the light fogging, known methods as described, for example, in JP-B-45-12710 and JP-A-61-159641, can be employed.

The silver halide used in the present invention can be spectrally sensitized with methine dyes or other dyes. Suitable dyes which can be employed include cyanine dyes, merocyanine dyes, complex cyanine dyes, complex merocyanine dyes, holopolar cyanine dyes, hemicyanine dyes, styryl dyes, and hemioxonol dyes. Among these dyes, cyanine dyes, merocyanine dyes and complex merocyanine dyes are particularly useful.

Any conventionally utilized nucleus for cyanine dyes can be employed as a basic heterocyclic nucleus for the cyanine dyes. That is, a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus, or a pyridine nucleus, and further, nuclei formed by condensing an alicyclic hydrocarbon ring with these nuclei and nuclei formed by condensing an aromatic hydrocarbon ring with these nuclei, that is, an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus, or a quinoline nucleus are appropriate. The carbon atoms of these nuclei may also be substituted.

For merocyanine dyes and complex merocyanine dyes, nuclei having a ketomethylene structure, 5-membered or 6-membered heterocyclic nuclei such as a pyrazolin-5-one nucleus, a thiohydrantoin nucleus, a 2-thiooxazolidin-2,4-dione nucleus, a thiazolidin-2,4dione nucleus, a rhodanine nucleus, or a thiobarbituric acid nucleus may also be applicable.

These sensitizing dyes can be employed individually or in combinations thereof. A combination of sensitizing dyes is often used, particularly for the purpose of supersensitization.

The sensitizing dyes may be present in the emulsion together with dyes which themselves do not give rise to spectrally sensitizing effects but which exhibit a supersensitizing effect or materials which do not substantially absorb visible light but which also exhibit a supersensitizing effect. For example, aminostyryl compounds substituted with a nitrogen-containing heterocyclic group (for example, those described in U.S. Pat. Nos. 2,993,390 and 3,635,721), aromatic organic acid-formaldehyde condensates (for example, those described in U.S. Pat. No. 3,743,510), cadmium salts, or azaindene compounds can be present. The combinations as described in U.S. Pat. Nos. 3,615,613, 3,615,641, 3,617,295 and 3,635,721 are particularly useful.

Gelatin is preferably used as the binder or protective colloid in the emulsion layers or intermediate layers of the photographic light-sensitive materials of the present invention, but other hydrophilic colloids may be used alone or together with gelatin.

The gelatin may be either a lime-treated gelatin or acid-treated gelatin in the present invention. Details on the preparation of gelatins are given in *The Macromolecular Chemistry of Gelatin*, written by Arthur Vaise, published by Academic Press, 1964.

The photographic emulsion used in the present invention may contain one or more surfactants singly or in the form of a mixture thereof.

These surfactants are essentially used as a coating aid and sometimes for some other purposes such as emulsification and dispersion, improvement of photographic characteristic for sensitization, static charge prevention and blocking prevention. These surfactants are classified into natural surfactants such as saponin; nonionic surfactants such as alkylene oxide type, glycerol type or glycidol type surfactants; cationic surfactants such as higher alkylamines, quaternary ammonium salts, pyridine and like heterocyclic compounds or phosphonium or sulfonium salts; anionic surfactants containing an acidic group such as a carboxylic acid, sulfonic acid, phosphoric acid, sulfate or phosphate group; and amphoteric surfactants such as amino acids, aminosulfonic aids or aminoalcohol sulfate or phosphate.

The photographic emulsion used in the present invention may contain various compounds for the purpose of the prevention of fog formation during production, storage or photographic processing of the photographic material, or for the purpose of stabilization of the photographic characteristic of the material. For these purposes, various compounds which are known as anti-fogging agents or stabilizers may be used, including azoles such as benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, and mercaptotetrazoles (especially 1-phenyl-5-mercaptotetrazole); mercaptopyrimidines; mercaptotriazines; thioketo compounds such as oxazolinethione; azaindenes such as triazaindenes, tetraazaindenes (especially 4-hydroxy-substituted-1,3,3a,7-tetraazaindenes), pentaazaindenes; benzenethiosulfinic acid; benzenesulfinic acid; and benzenesulfonic acid amide.

The photographic emulsion layer of the photographic light-sensitive material of the present invention may contain, for the purpose of increasing sensitivity, intensification of contrast or acceleration of development, for example, thioether compounds, thiomorpholines, quaternary ammonium salt compounds, urethane derivatives, urea derivatives, imidazole derivatives or 3 pyrazolidones.

The photographic light-sensitive material according to the present invention may further contain, in the photographic emulsion layers or in any other hydrophilic colloid layers, a water-insoluble or sparingly soluble synthetic polymer dispersion for the purpose of the improvement of the dimensional stability of the photographic material. Polymers usable for this purpose are homopolymers or copolymers of alkyl (meth)acrylate, alkoxyalkyl (meth)acrylates, glycidyl (meth)acrylates, (meth)acrylamides, vinyl esters (such as vinyl acetate), acrylonitriles, olefins and/or styrenes; as well as copolymers made of a combination of the above-described monomers and other monomer components such as acrylic acid, methacrylic acid, $\alpha,\beta$-unsaturated dicarboxylic acids, hydroxyalkyl (meth)-acrylates, sulfoalkyl (meth)acrylates and styrenesulfonic acids.

The silver halide photographic material of the present invention may contain various other conventional additives, for example, hardening agents, whitening agents, dyes, desensitizers, coating aids, antistatic agents, plasticizers, slipping agents, matting agents, development accelerating agents, mordanting agents, ultraviolet light absorbing agents, color fading preventing agents and color fog preventing agents.

Specific examples of such additives to be used are described, for example, in *Research Disclosure*, Vol. 176, No. 17643 (December, 1978), pages 22 to 31.

The compound represented by the general formula (I) which is capable of releasing a diffusible dye according to the present invention can be preferably employed in heat-developable light-sensitive materials utilizing silver halide in which a mobile dye is formed upon heat development and the dye is transferred to a dye fixing layer as described, for example, in JP-A-58-149046, JP-A-59-154445, JP-A 59-165054, JP-A-59-180548, JP-A-59-218443, JP-A-60-133449, U.S. Pat. Nos. 4,503,137, 4,474,867, 4,483,914, 4,455,363 and 4,500,626, and JP-A-60-79709. The heat-developable light-sensitive material is hereinafter referred to sometimes as a light-sensitive element.

In the case compound (I) is applied to heat-developable light-sensitive elements, an organic metal salt may be employed as an oxidizing agent together with the light-sensitive silver halide. Among the organic metal salts, organic silver salts are particularly preferred.

Examples of organic compounds which can be used to form the above-described organic silver salt oxidizing agent include benzotriazoles, fatty acids and other compounds as described in U.S. Pat. No. 4,500,626 (columns 52 and 53). Other examples of useful organic compounds include silver salts of carboxylic acids containing an alkynyl group such as silver phenylpropiolate as described in JP-A-60-113235 and acetylene silver as described in JP-A-61-249044. Two or more organic silver salts may be used in combination.

These organic silver salts may be used in an amount of from 0.01 to 10 mol, preferably from 0.01 to 1 mol, per mol of light-sensitive silver halide. The total amount of light-sensitive silver halide and organic silver salt to be coated is preferably in the range of 50 mg to 10 g/m$^2$ in terms of silver.

In the present invention, various antifogging agents or photographic stabilizers may be used. Examples of such antifogging agents or photographic stabilizers used include azoles and azaindenes as described in *Research Disclosure*, No. 17643, pages 24 and 25 (1978), carboxylic acids or phosphoric acids containing nitrogen as described in JP-A-59-168442, mercapto compounds and salts thereof as described in JP-A-59-111636, and acetylene compounds as described in JP-A-62-87957.

As binders for the layers constituting the light-sensitive element and dye fixing element, hydrophilic binders are preferably employed. Examples of such binders are described in JP-A-62-253159, pages 26 to 28. More specifically, transparent or translucent hydrophilic binders are preferred. Suitable examples of such binders include natural substances such as proteins (for example, gelatin and gelatin derivatives) and polysaccharides (for example, cellulose derivatives, starch, gum arabic, dextrin and pullulan), and synthetic polymer compounds (for example, polyvinyl alcohol, polyvinylpyrrolidone and acrylamide polymers).

Further, highly water absorptive polymers such as homopolymers of vinyl monomer containing —COOM or —SO$_3$M (wherein M represents a hydrogen atom or an alkali metal) or copolymers comprising two or more of such vinyl monomers or comprising such a vinyl monomer and another vinyl monomer (for example, sodium methacrylate, ammonium methacrylate and Sumikagel ® L-5H manufactured by Sumitomo Chemical Co., Ltd.) as described, for example, in JP-A-62-245260.

Two or more of these binders may be employed in combination.

When a system wherein heat development and transfer of dye are simultaneously conducted in the presence of a small amount of water, it becomes possible to absorb water rapidly using the above-described highly water absorptive polymer. Further, re-transfer of dyes from a dye fixing element to other materials after dye transfer is prevented by incorporating the highly water absorptive polymer into a dye fixing layer or a protective layer thereof.

In the present invention, the amount of the binder to be coated is preferably 20 g or less, more preferably 10 g or less, particularly preferably 7 g or less, per square meter.

Various polymer latexes can be incorporated into layers constituting the light-sensitive element or dye fixing element (including a backing layer), for the purpose of improving physical properties of the layers, i.e., increasing dimensional stability, preventing curling, blocking or cracking, and preventing pressure sensitization or desensitization. Specifically, any of the polymer latexes as described, for example, in JP-A-62-245258, JP-A-62-136648 and JP-A-62-110066 may be employed. In particular, the cracking of a mordanting layer can be prevented using a polymer latex having a low glass transition point (40° C. or less) in the mordanting layer, and curling can be effectively prevented by adding a polymer latex having a high glass transition point to the backing layer.

The reducing agents which can be used in the present invention are those known in the field of heat-developable light-sensitive materials. Also, there may be employed dye providing compounds having a reducing power. In the latter case, other reducing agents may be employed together therewith. Furthermore, as such reducing agents there can be used precursors of reducing agents which have no reducing power themselves but take on reducing power when acted on by nucleophilic reagents or heat during development.

Examples of reducing agents which can be used in the present invention include reducing agents and precursors thereof as described, for example, in U.S. Pat. Nos. 4,500,626 (columns 49 to 50), 4,483,914 (columns 30 to 31), 4,330,617 and 4,590,152, JP-A-60-140335 (pages 17 and 18), JP-A-57-40245, JP-A-56-138736, JP-A-59-17845, JP-A-59-53831, JP-A-59-182449, JP-A-59-182450, JP-A-60-119555, JP-A-60-128436, JP-A-60-128437, JP-A-60-128438, JP-A-60-128439, JP-A-60198540, JP-A-60-181742, JP-A-61-259253, JP-A-62-244044, JP-A-62-131253, JP-A-62-131254, JP-A-62-131255, JP-A-62-131256, and European Patent 220,746A2 (pages 78 to 96).

Combinations of various reducing agents as disclosed in U.S. Pat. No. 3,039,869 may be used in the present invention.

When using a diffusion resistant reducing agent, an electron transfer agent and/or a precursor thereof can be employed in combination, if desired, in order to accelerate transfer of electrons between the diffusion resistant reducing agent and developable silver halide. Suitable electron transfer agents or precursors thereof can be selected from the reducing agents or precursors thereof described above. It is desired that the mobility of the electron transfer agent or precursor thereof is larger than that of the diffusion resistant reducing agent (electron donor). Particularly useful electron transfer agents are 1-phenyl-3-pyrazolidones and aminophenols.

The diffusion resistant reducing agents (electron donors) which can be used together with the electron transfer agent may be any one of the above-described reducing agents which is substantially immobile in the layers of the light-sensitive element. Hydroquinones, sulfonamidophenols, sulfonamidonaphthols, electron donor compounds as described in JP-A-53-110827 or diffusion resistant dye providing compounds having a reducing power as described hereinafter are preferably employed.

In the present invention, the amount of the reducing agent added is preferably from 0.01 to 20 mols, particularly preferably from 0.1 to 10 mols, per mol of silver.

In the present invention, the light-sensitive element may contain a compound which serves to activate development as well as to stabilize images. Specific examples of such compounds which can be preferably used in the present invention are described in U.S. Pat. No. 4,500,626 (column 51 to 52).

In a system which employs a dye diffusion transfer to form images, a dye fixing element is used together with a light-sensitive element. The light-sensitive element and the dye fixing element can be separately coated on two supports, or the light-sensitive element and dye fixing element can be coated on the same support.

For the relationship between the light-sensitive element and the dye fixing element, between the light-sensitive element and the support, and between the light-sensitive element and the white reflecting layer, those as described in U.S. Pat. No. 4,500,626 (column 57) can be applied to the present invention.

The dye fixing element which may be preferably used in the present invention comprises at least one layer containing a mordant and a binder. Mordants which can be used in the present invention include those known in the field of photography, and specific examples thereof are mordants as described, for example, in U.S. Pat. No. 4,500,626 (columns 58 to 59), JP-A-61-88256 (pages 32 to 41), JP-A-62-244043 and JP-A-62-244036. Further, dye receptive polymer compounds as described in U.S. Pat. No. 4,463,079 may be employed.

The dye fixing element may comprise a subsidiary layer, for example, a protective layer, a stripping layer and an anti-curling layer, if desired. Particularly, it is effective to provide a protective layer.

To the layers constituting the light-sensitive element and dye fixing element, plasticizers, slipping agents, and organic solvents having a high boiling point as agents for improving the stripping property of the light-sensitive element and dye fixing element can be added thereto. Specific examples thereof are those as described, for example, in JP-A-62-253159 (page 25) and JP-A-62-245253.

Moreover, for the stripping purpose described above, various silicone oils (for example, dimethyl silicone oil and modified silicone oils obtained by introducing various organic groups to dimethylsiloxane) can be employed. Preferred examples of the silicone oils are various modified silicone oils, particularly carboxy-modified silicone (trade name: X-22-3710) as described in *Modified Silicone Oil*, technical data, pages 6 to 18B published by Shin-Etsu Silicone Co. Silicone oils described in JP-A-62-215953 and JP-A-6346449 are also effective.

In the light-sensitive element and dye fixing element, color fading preventing agents may be employed. Color fading preventing agents include antioxidants, ultraviolet light absorbing agents and certain kinds of metal complexes.

Suitable examples of antioxidants include chroman series compounds, courmaran series compounds, phenol series compounds (for example, hindered phenols), hydroquinone derivatives, hindered amine derivatives and spiroindane series compounds. Further, compounds as described in JP-A-61-159644 ar also effective.

Suitable examples of ultraviolet light absorbing agents include benzotriazole series compounds (such as those described in U.S. Pat. No. 3,533,794), 4-thiazolidone series compounds (such as those described in U.S. Pat. No. 3,352,681), benzophenone series compounds (such as those described in JP-A-46-2784), and compounds as described in JP-A-54-48535, JP-A-62-136641 and JP-A-61-88256. Further, ultraviolet light absorptive polymers as described in JP-A-62-260152 are effective.

Suitable examples of metal complexes include compounds as described in, for example, U.S. Pat. Nos. 4,241,155, 4,245,018 (columns 3 to 36), and 4,254,195 (columns 3 to 8), JP-A-62-174741, JP-A-61-88256 (pages 27 to 29), JP-A-1-75568, and JP-A-63-199248.

Suitable examples of color fading preventing agents are described in JP-A-62-215272 (pages 125 to 137).

Color fading preventing agents for the purpose of preventing fading of transferred dyes in the dye fixing element can be previously incorporated into the dye fixing element or may be supplied to the dye fixing element from the outside, for example, from the light-sensitive element.

The above-described antioxidants, ultraviolet light absorbing agents and metal complexes may be used in combination.

In the light-sensitive element and dye fixing element, there may be used fluorescent whitening agents. It is particularly preferred to incorporate fluorescent whitening agents into the dye fixing element or to supply them from the outside, for example, from the light-sensitive element. Suitable examples of fluorescent whitening agents are described, for example, in K. Veenkataraman, *The Chemistry of Synthetic Dyes*, Vol. V, Chapter 8 and JP-A-61-143752. More specifically, preferred fluorescent whitening agents include stilbene series compounds, coumarin series compounds, biphenyl series compounds, benzoxazolyl series compounds, phthalimide series compounds, pyrazoline series compounds and carbostyryl series compounds.

The fluorescent whitening agents may be employed in combination with the color fading preventing agents.

Suitable examples of hardening agents which can be used in the layers constituting the light-sensitive element and dye fixing element include those as described in U.S. Patent 4,678,739 (column 41), JP-A-59-116655, JP-A-62-245261 and JP-A-61-18942. More specifically, aldehyde series hardeners (for example, form aldehyde), aziridine series hardeners, epoxy series hardeners (for example,

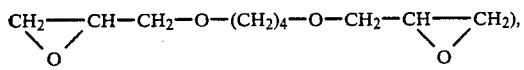

vinylsulfone series hardeners (for example, N,N'-ethylenebis(vinylsulfonylacetamido)ethane), N-methylol series hardeners (for example, dimethylolurea), and polymer hardeners (for example, compounds as described in JP-A-62-234157) can be mentioned.

To the layers comprising the light-sensitive element and dye fixing element, various surface active agents can be added as coating aids or for other purposes, for example, improvement in stripping property, improvement in slipping property, antistatic property, and development acceleration. Specific examples of useful surface active agents are described in JP-A-62-173463 and JP-A-62-183457.

Organic fluoro compounds may be incorporated into the layers constituting the light-sensitive element and dye fixing element, for the purpose of improvement in slipping property, antistatic property, and improvement in stripping property Typical examples of the organic fluoro compounds include fluorine series surface active agents as described in JP-B-57-9053 (columns 8 to 17), JP-A-61-20944 and JP-A-62-135826, oily fluorine series compounds such as fluoro oil, and hydrophobic fluorine compounds such as solid fluoro resin compound, for example, tetrafluoroethylene resin.

In the light-sensitive element and dye fixing element, matting agents can be used. Suitable examples of matting agents include silicon dioxide, compounds such as polyolefin and polymethacrylate as described in JP-A-61-88256, page 29, as well as benzoguanamine resin beads, polycarbonate resin beads and AS resin beads as described in JP-A-63-274944 and JP-A-63-274952.

Furthermore, other additives, for example, heat solvents, defoaming agents, sterilizers, antimolds, and colloidal silica may be incorporated into the layers constituting the light-sensitive element and dye fixing element. Specific examples of these additives used are described in JP-A-61-88256, pages 26 to 32.

In the light-sensitive element and/or dye fixing element according to the present invention, image formation accelerating agents can be employed. Such image formation accelerating agents serve to accelerate an oxidation reduction reaction of a silver salt oxidizing agent with a reducing agent, a reaction such as the formation or decomposition of a dye or release of a diffusible dye from a dye providing substance, and migration of a dye from a light-sensitive material layer to a dye fixing layer. In view of physicochemical function, image formation accelerating agents can be classified into bases or base precursors, nucleophilic compounds, organic solvents having a high boiling point (oils), heat solvents, surface active agents, and compounds capable of interacting with silver or silver ion. However, these substance groups generally have a composite function and thus a combination of the above-described accelerating effects. The details thereof are described in U.S. Pat. No. 4,678,739 (columns 38 to 40).

Examples of useful base precursors include salts of organic acids and bases which decompose by heating with decarboxylation, and compounds which release an amine upon decomposition with an intramolecular nucleophilic displacement reaction, a Lossen rearrangement reaction or a Beckmann rearrangement reaction. Specific examples thereof are described, for example, in U.S. Pat. No. 4,511,493 and JP-A-62-65038.

In a system wherein heat development and transfer of dye are simultaneously conducted in the presence of a small amount of water, it is preferred to incorporate a base and/or a base precursor into the dye fixing element from the standpoint of increasing preservability of the light-sensitive material.

In addition, combinations of sparingly soluble metal compounds and compounds (referred to as complex forming compounds) capable of forming a complex with a metal ion constituting the sparingly soluble metal compound as described in European Patent 210,660A, and compounds which generate a base upon electrolysis as described in JP-A-61-232451 can be employed as base precursors. Particularly, the former method is effective. It is advantageous that the sparingly soluble metal compound and the complex forming compound are added separately to the light-sensitive element and the dye fixing element.

In the light-sensitive element and/or dye fixing element, various development stopping agents can be used for the purpose of providing a constant image against any fluctulation in processing temperature and time during development.

The term "development stopping agent" as used herein means a compound which rapidly neutralizes or reacts with a base to decrease the base concentration in the layer so that development is stopped after proper development, or a compound which interacts with silver or a silver salt to inhibit development after proper development. Specific examples of such development stopping agents include acid precursors which release an acid upon heating, electrophilic compounds which undergo a displacement reaction with a base present therewith upon heating, nitrogen-containing heterocyclic compounds, mercapto compounds and precursors thereof. More specifically, those agents described in JP-A-62 253159 (pages 31 and 32) are employed.

Supports used in the light-sensitive element and dye fixing element according to the present invention are those which can endure the processing temperature. In general, paper and synthetic polymer films are employed. More specifically, films of polyethylene terephthalate, polycarbonate, polyvinyl chloride, polystyrene, polypropylene, polyimide or celluloses (for example, triacetyl cellulose) or those films containing a pigment such as titanium oxide, synthetic paper produced from polypropylene, paper manufactured from a mixture of synthetic pulp such as polyethylene and natural pulp, Yankee paper, baryta paper, coated paper (particularly cast coating paper), metals, cloths, and glass are employed. These materials may be employed individually as a support, or one or both surfaces of these materials can be laminated with synthetic polymers such as polyethylene to form the support. Further, supports as described in JP-A-62-253159 (pages 29 to 31) are usable.

On the surface of the support, a mixture of a hydrophilic binder and a semiconductive metal oxide such as alumina sol and tin oxide, and an antistatic agent such as carbon black may be coated.

In order to expose an image for recording on the light sensitive material, various methods can be utilized, for example, a method of direct photographing a landscape or portrait using a camera, a method of exposure through a reversal film or a negative film by means of a printer or an enlarger, a method of scanning exposure of an original through a slit using an exposure device of a copying machine, a method wherein image information is exposed upon light emission from a light emitting diode or various laser via an electric signal, and a method wherein image information on an image display device, for example, CRT, liquid crystal display, electroluminescence display, or plasma display is exposed directly or through an optical system.

Light sources for recording an image on the light-sensitive element which can be used include those as described in U.S. Pat. No. 4,500,626 (column 50) such as natural light, tungsten lamps, light emitting diodes, laser light sources, and CRT light sources.

Moreover, the above-described image formations which can be used include image signals obtained by a video camera or an electro still camera, television signals representatively illustrated by Japan Television Signal Standard (NTSC), image signals obtained by dividing an original into many dots by means of a scanner, and image signals prepared by means of a computer representatively illustrated by CG and CAD.

In accordance with the present invention, color photographic light-sensitive materials which provide yellow dye images which are stable to heat and light and have high image density in a rapid manner are obtained by incorporating the image forming compound represented by the general formula (I) described above. Further, color photographic light-sensitive materials which provide yellow dye images having excellent hue which does not substantially change over a wide pH range are obtained according to the present invention.

The present invention will be explained in greater detail with reference to the following examples, but the present invention should not be construed as being limited thereto.

EXAMPLE 1

A process for the preparation of a dye fixing element is described hereinafter. 63 g of gelatin and 130 g of a mordant shown below were dissolved in 1,300 ml of water and the solution was coated at a wet layer thickness of 45 μm on a polyethylene terephthalate film support and dried.

Mordant

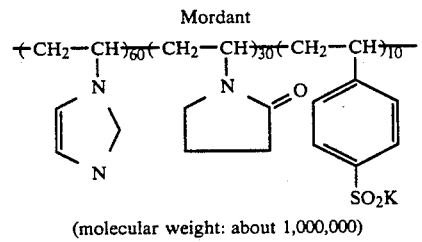

(molecular weight: about 1,000,000)

On the layer thus-coated, an aqueous solution prepared by dissolving 35 g of gelatin and 1.05 g of 1,2-bis(-vinylsulfonylacetamido)ethane in 800 ml of water was coated at a wet layer thickness of 17 μm and dried to prepare Dye Fixing Material D-1.

Mixed solutions of DMF (dimethylformamide) and a 2% aqueous solution of sodium hydrogencarbonate at a volume ratio of 1:10 containing a yellow dye Y-A (which is a dye moiety of the compound according to the present invention) described below or a yellow dye Y-B (comparative compound) described below were prepared, respectively.

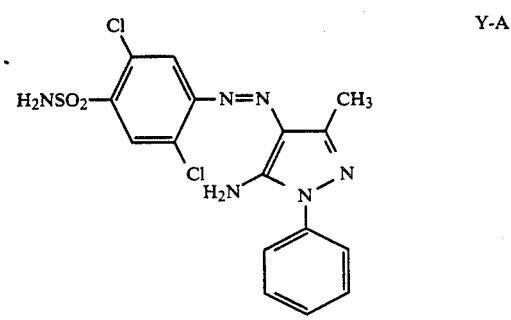

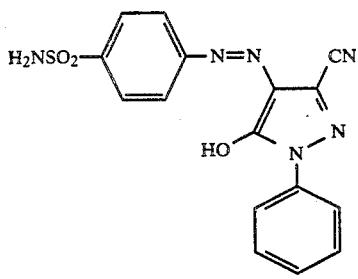

Y-B

The above-described Dye Fixing Material D-1 was immersed in each of the dye solutions until the transmittance density became 1.0, washed with distilled water for 10 seconds, and dried to prepare Samples 101 and 102.

Using these samples, light-fastness of the dye was evaluated. The light-fastness test was conducted by a fluorescent lamp of 17,000 lux without a UV filter, and irradiation time for reaching a density of 0.9 was determined. The results thus-obtained are shown below.

| | Light-Fastness Test | |
|---|---|---|
| Sample | Dye | Number of Days |
| 101 | Y-A | 24 |
| 102 | Y-B | 17 |

From the results shown above, it can be seen that the dye moiety Y A in the compound according to the present invention is excellent in light fastness as compared with a highly stable pyrazolone yellow dye Y-B ordinarily employed in the diffusion transfer process.

EXAMPLE 2

A dichromate gelatin hardened layer which had been prepared by coating a gelatin light-sensitive solution containing ammonium dichromate on a glass substrate, wholly irradiating using a mercury vapor lamp, washing with water and drying at a dry layer thickness of 1.2 μm was colored at a transmittance density of 1.0 using an aqueous solution of a water-soluble yellow dye Y-C (which is a dye moiety of the compound according to the present invention) described below and an aqueous solution of a water-soluble yellow dye Y-D (comparative compound) described below to prepare Samples 201 and 202, respectively.

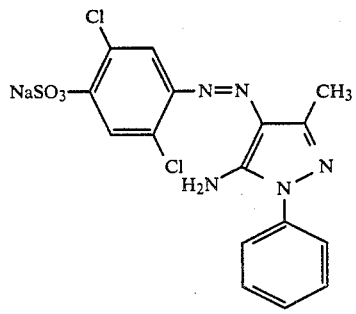

Y-C

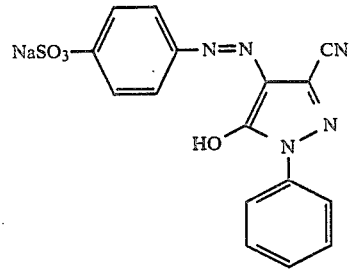

Y-D

Using these samples, heat-fastness of the dye was evaluated. The heat-fastness test was conducted by an oven at 180° C. for 3 hours. The density of each sample is shown below.

| | Heat-Fastness Test | |
|---|---|---|
| Sample | Dye | Density |
| 201 | Y-C | 0.98 |
| 202 | Y-D | 0.86 |

From the results shown above, it is apparent that the dye moiety in the compound according to the present invention is excellent in heat-fastness as compared with the pyrazolone yellow dye ordinarily employed in the diffusion transfer process.

Further, as a result of the same test with the 5-aminopyrazole azo dyes other than Y-C according to the present invention, similar high heat-fastness was observed.

EXAMPLE 3

Multilayer Color Light-Sensitive Material 301 as shown in Table 1 below was prepared.

TABLE 1

| Sixth layer: Protective Layer | |
|---|---|
| Gelatin | 1,000 mg/m$^2$ |
| Base precursor*$^3$ | 600 mg/m$^2$ |
| Silica*$^5$ | 100 mg/m$^2$ |
| Hardening agent*$^6$. | 160 mg/m$^2$ |
| Fifth Layer: Green-Sensitive Emulsion Layer | |
| Silver chlorobromide emulsion (bromide content: 50 mol %) | 400 mg silver/m$^2$ |
| Benzenesulfonamide | 180 mg/m$^2$ |
| Organic silver salt (1) | 50 mg/m$^2$ |
| Organic silver salt (2) | 50 mg/m$^2$ |
| Sensitizing dye (D-1) | $10^{-6}$ mol/m$^2$ |
| Base precursor*$^3$ | 500 mg/m$^2$ |
| Antifogging agent | 24 mg/m$^2$ |
| Yellow image forming compound (36) | 400 mg/m$^2$ |
| Gelatin | 1,000 mg/m$^2$ |
| High boiling solvent*$^4$ | 800 mg/m$^2$ |
| Surface active agent*$^2$ | 100 mg/m$^2$ |
| Fourth Layer: Intermediate Layer | |
| Gelatin | 1,200 mg/m$^2$ |
| Base precursor*$^3$ | 600 mg/m$^2$ |
| Third Layer: Red-Sensitive Emulsion Layer | |
| Silver chlorobromide emulsion (bromide content: 80 mol % | 300 mg/m$^2$ |
| Benzenesulfonamide | 180 mg/m$^2$ |
| Organic silver salt (1) | 50 mg/m$^2$ |
| Organic silver salt (2) | 50 mg/m$^2$ |
| Sensitizing dye (D-2) | $10^{-7}$ mol/m$^2$ |
| Base precursor*$^3$ | 450 mg/m$^2$ |
| Antifogging agent | 24 mg/m$^2$ |
| Magenta image forming compound (1) | 400 mg/m$^2$ |
| Gelatin | 1,000 mg/m$^2$ |
| High boiling solvent*$^1$ | 600 mg/m$^2$ |
| Surface active agent*$^2$ | 100 mg/m$^2$ |
| Second Layer: Intermediate Layer | |

TABLE 1-continued

| | |
|---|---|
| Gelatin | 1,000 mg/m² |
| Base precursor*³ | 600 mg/m² |
| First Layer: Infrared-Sensitive Emulsion Layer | |
| Silver chlorobromide emulsion | 300 mg silver/m² |
| (bromide content: 50 mol %) | |
| Benzensulfonamide | 180 mg/m² |
| Organic silver salt (1) | 50 mg/m² |
| Organic silver salt (2) | 50 mg/m² |
| Sensitizing dye (D-3) | $10^{-8}$ mol/m² |
| Base precursor*³ | 500 mg/m² |
| Antifogging agent | 18 mg/m² |
| Cyan image forming compound (2) | 300 mg/m² |
| Gelatin | 1,000 mg/m² |
| High boiling solvent*⁴ | 600 mg/m² |
| Surface active agent*² | 100 mg/m² |
| Support*⁷ | |

*¹Tricresyl phosphate

*² 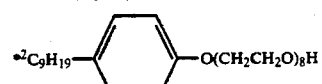

*³Guanidine 4-chlorophenylsulfonylacetate
*⁴(iso-$C_9H_{19}O)_3P=O$
*⁵4 μm size
*⁶1,2-Bis(vinylsulfonylacetamido)ethane
*⁷Polyethylene terephthalate (100 μm thick)

(D-1)
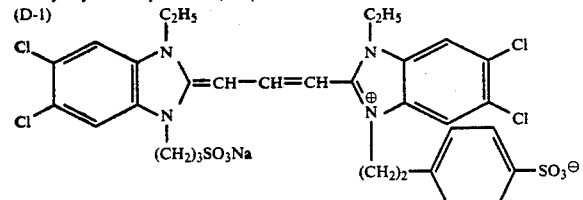

(D-2)
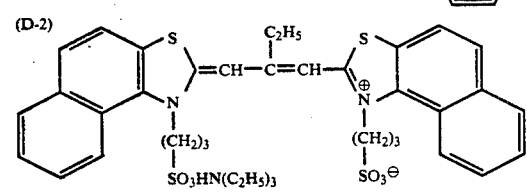

(D-3)
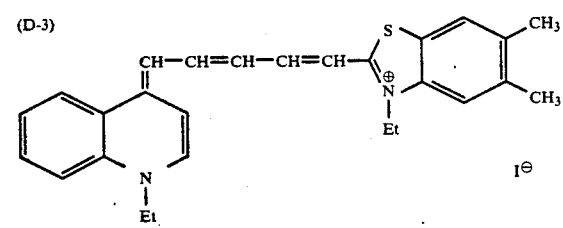

Yellow Image Forming Compound (36)
according to the present invention

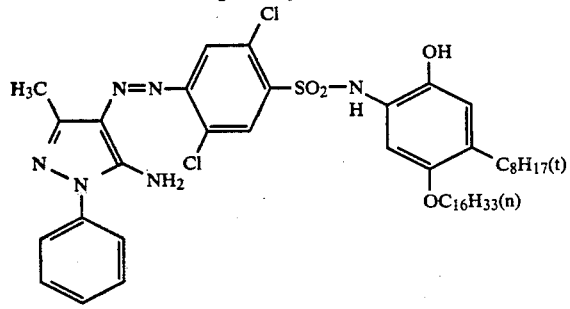

Magenta Image Forming Compound (1)

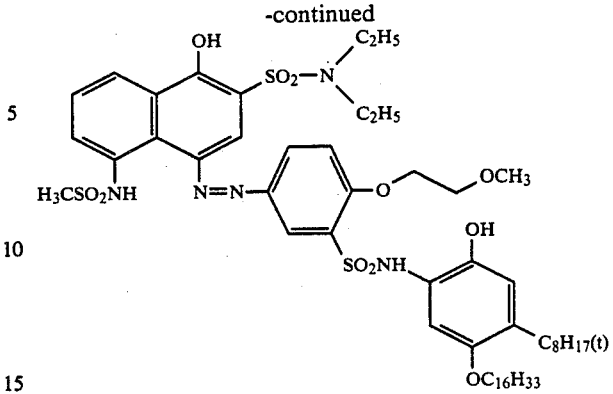

Cyan Image Forming Compound (2)

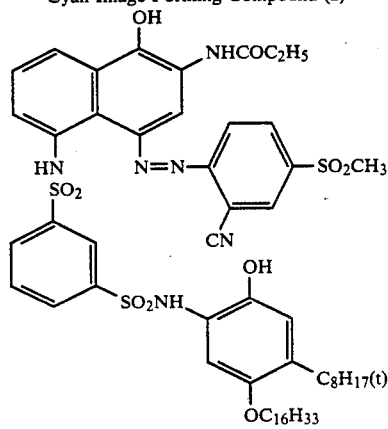

A process for the preparation of silver halide emulsions for the fifth layer and the first layer is described hereinafter.

600 ml of an aqueous solution containing sodium chloride and potassium bromide and an aqueous solution of silver nitrate which had been prepared by dissolving 0.59 mol of silver nitrate in 600 ml of water were simultaneously added to an aqueous solution of gelatin which had been prepared by dissolving 20 g of gelatin and 3 g of sodium chloride in 1,000 ml of water and kept at a temperature of 75° C. at the same flow rate over a period of 40 minutes while the latter was being vigorously stirred. Thus, a monodispersed cubic silver chlorobromide emulsion (bromide content: 50 mol%) having an average particle size of 0.40 μm was prepared.

After being washed with water and desalted, the emulsion was chemically sensitized with 5 mg of sodium thiosulfate and 20 mg of 4-hydroxy-6-methyl-1,3,3a,7-tetraazaindene at a temperature of 60° C. The yield of the emulsion was 600 g.

A process for the preparation of a silver halide emulsion for the third layer is described hereinafter.

600 ml of an aqueous solution containing sodium chloride and potassium bromide and an aqueous solution of silver nitrate which had been prepared by dissolving 0.59 mol of silver nitrate in 600 ml of water were simultaneously added to an aqueous solution of gelatin which had been prepared by dissolving 20 g of gelatin and 3 g of sodium chloride in 1,000 ml of water and kept at a temperature of 75° C. at the same flow rate over a period of 40 minutes while the latter was being stirred vigorously. Thus, a monodispersed cubic silver chlorobromide emulsion (bromide content: 80 mol %)

having an average particle size of 0.35 μm was prepared.

After being washed with water and desalted, the emulsion was chemically sensitized with 5 mg of sodium thiosulfate and 20 mg of 4-hydroxy-6-methyl-1,3,3a,7-tetraazaindene at a temperature of 60° C. The yield of the emulsion was 600 g.

A process for the preparation of a gelatin dispersion of an image forming compound is described hereinafter.

A mixture of 5 g of Yellow Image Forming Compound (36) according to the present invention, 0.3 g of an antifogging agent described below, 0.5 g of sodium succinate-2-ethylhexyl ester sulfonate, as a surface active agent, 10 g of triisononyl phosphate and 30 ml of ethyl acetate was dissolved by heating at about 60° C. to prepare a uniform solution. This solution was mixed with 100 g of a 10% aqueous gelatin solution of lime-processed gelatin with stirring and the mixture was then dispersed by means of a homogenizer at 10,000 rpm for 10 minutes. The dispersion thus obtained was designated a dispersion of yellow image forming compound.

Antifogging Agent:

Dispersions of magenta and cyan image forming compounds were prepared in the same manner as described above using Magenta Image Forming Compound (1) and Cyan Image Forming Compound (2) as described above, respectively.

A process for the preparation of organic silver salt is described below.

Organic Silver Salt (1)

A process for the preparation of a benzotriazole silver emulsion is described hereinafter.

28 g of gelatin and 13.2 g of benzotriazole were dissolved in 300 ml of water. The solution was then stirred with the temperature kept at 40° C. A solution of 17 g of silver nitrate dissolved in 100 ml of water was added to the solution over a period of 2 minutes.

The pH of the benzotriazole silver emulsion was properly adjusted to flocculate. The excess salts were then removed. The pH of the emulsion was then adjusted to 6.30 to obtain 400 g of the benzotriazole silver emulsion.

Organic Silver Salt (2)

A process for the preparation of a dispersion of Organic Silver Salt (2) is described hereinafter.

20 g of gelatin and 5.9 g of 4-acetylaminophenyl propiolic acid were dissolved in 1,000 ml of a 0.1% aqueous sodium hydroxide solution and 200 ml of ethanol. The solution thus prepared was then stirred with the temperature thereof kept at 40° C. A solution of 4.5 g of silver nitrate dissolved in 200 ml of water was added to the solution over a period of 5 minutes.

The pH of the dispersion thus prepared was properly adjusted to flocculate. The excess salts were then removed. The pH of the dispersion was adjusted to 6.3 to obtain 300 g of the dispersion of Organic Silver Salt (2).

Dye Fixing Material D-2 was prepared in the same manner as described for Dye Fixing Material D-1 used in Example 1, except for using a polyethylene laminated paper as a support.

The above-described Multilayer Color Photographic Light-Sensitive Material 301 was exposed through a three color separation filter of G, R and IR (G: filter transmitting a band of 500 nm to 600 nm, R: filter transmitting a band of 600 nm to 700 nm, IR: filter transmitting a band of 700 nm or higher), the density of which continuously changes, for 1 second at 500 lux using a tungsten lamp and then uniformly heated for 30 seconds on a heat block which had been heated to 140° C.

To the coated layer of Dye Fixing Material D-2 was applied 20 ml per m² of water, and the above-heated light-sensitive material was then superimposed on the dye fixing material in such a manner that their coated layers were in contact with each other.

After heating for 6 seconds on a heat block maintained at 80° C, the dye fixing material was separated from the light-sensitive material, whereupon yellow, magenta and cyan color images were obtained in the dye fixing material corresponding to the three color separation filter of G, R and IR, respectively.

The maximum density (Dmax) and the minimum density (Dmin) of each color were measured using a Macbeth reflection densitometer (RD-519).

The results thus obtained are shown below.

|  | Dmax | Dmin |
|---|---|---|
| Yellow | 1.95 | 0.20 |
| Magenta | 2.15 | 0.22 |
| Cyan | 2.10 | 0.21 |

From the results shown, it is apparent that the yellow image forming compound according to the present invention provides a good image.

EXAMPLE 4

Light Sensitive Material 401 having the composition shown in Table 2 below was prepared.

TABLE 2

| Sixth Layer: Protective Layer | |
|---|---|
| Gelatin | 0.91 g/m² |
| Matting agent (silica) | 0.03 g/m² |
| Water-soluble polymer (1) | 0.23 g/m² |
| Surface active agent (1) | 0.06 g/m² |
| Surface active agent (2) | 0.13 g/m² |
| Hardening agent (1) | 0.01 g/m² |
| ZnSO$_4$.7H$_2$O | 0.06 g/m² |
| Fifth Layer: Blue-Sensitive Layer | |
| Emulsion (III) | 0.58 g/m² as silver |
| Gelatin | 0.68 g/m² |
| Antifogging agent (1) | 1.36 × 10$^{-3}$ g/m² |
| Yellow dye providing compound (1) | 0.50 g/m² |
| Organic solvent having a high boiling point (1) | 0.25 g/m² |
| Electron donor (ED-1) | 0.25 g/m² |
| Surface active agent (3) | 0.05 g/m² |
| Electron transfer agent (X-2) | 0.03 g/m² |
| Hardening agent (1) | 0.01 g/m² |
| Water-soluble polymer (2) | 0.02 g/m² |
| Fourth Layer: Intermediate Layer | |
| Gelatin | 0.75 g/m² |
| Zn(OH)$_2$ | 0.32 g/m² |
| Reducing agent (ED-7) | 0.11 g/m² |
| Surface active agent (1) | 0.02 g/m² |
| Surface active agent (4) | 0.07 g/m² |
| Water-soluble polymer (2) | 0.02 g/m² |
| Hardening agent (1) | 0.01 g/m² |

TABLE 2-continued

| Third Layer: Green-Sensitive Layer | |
|---|---|
| Emulsion (II) | 0.41 g/m² as silver |
| Gelatin | 0.47 g/m² |
| Antifogging agent (I) | $1.25 \times 10^{-3}$ g/m² |
| Magenta dye providing compound (2) | 0.37 g/m² |
| Organic solvent having a high boiling point (1) | 0.19 g/m² |
| Electron donor (ED-1) | 0.14 g/m² |
| Surface active agent (3) | 0.04 g/m² |
| Electron transfer agent (X-2) | 0.03 g/m² |
| Hardening agent (1) | 0.01 g/m² |
| Water-soluble polymer (2) | 0.02 g/m² |
| Second Layer: Intermediate Layer | |
| Gelatin | 0.80 g/m² |
| Zn(OH)₂ | 0.31 g/m² |
| Reducing agent (ED-7) | 0.11 g/m² |
| Surface active agent (1) | 0.06 g/m² |
| Surface active agent (4) | 0.10 g/m² |
| Water-soluble polymer (2) | 0.03 g/m² |
| Hardening agent (1) | 0.01 g/m² |
| First Layer: Red-Sensitive Layer | |
| Emulsion (I) | 0.36 g/m² as silver |
| Sensitizing Dye (D-51) | $1.07 \times 10^{-3}$ g/m² |
| Gelatin | 0.49 g/m² |
| Antifogging agent (1) | $1.25 \times 10^{-3}$ g/m² |
| Cyan dye providing compound (3) | 0.37 g/m² |
| Organic solvent having a high boiling point (1) | 0.18 g/m² |
| Electron donor (ED-1) | 0.14 g/m² |
| Surface active agent (3) | 0.04 g/m² |
| Electron transfer agent (X-2) | 0.03 g/m² |
| Harding agent (1) | 0.01 g/m² |
| Water-soluble polymer (2) | 0.02 g/m² |
| Support: | |
| Polyethylene terephthalate (thickness: 100 μm) | |
| Backing Layer: | |
| Carbon black | 0.44 g/m² |
| Polyester | 0.30 g/m² |
| Polyvinyl chloride | 0.30 g/m² |

The additives shown in Table 2 above are illustrated below.

Water-Soluble Polymer (1)
Sumikagel ® L-5H manufactured by Sumitomo Chemical Co., Ltd.

Water-Soluble Polymer (2)

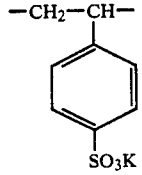

(molecular weight: 800,000)

Surface Active Agent (1)
Aerosol ® OT

Surface Active Agent (2)

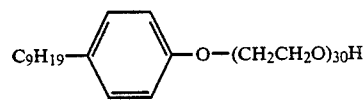

Surface Active Agent (3)

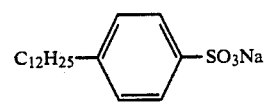

Surface Active Agent (4)

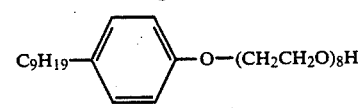

Hardening Agent (1)
1,2-Bis(vinylsulfonylacetamido)ethane

Organic Solvent Having a High Boiling Point (1)
Tricyclohexyl phosphate

Yellow Dye Providing Compound (1)

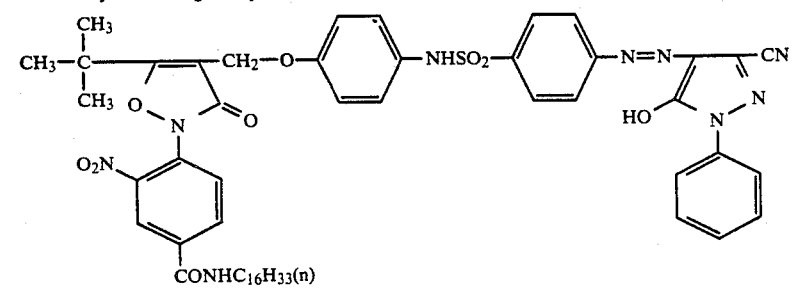

Magenta Dye Providing Compound (2)
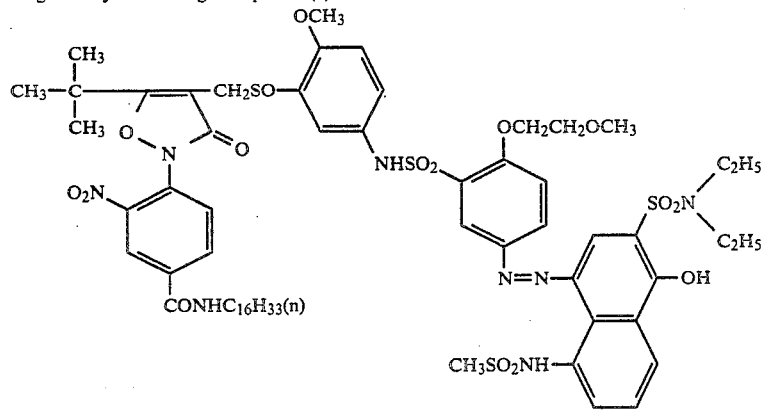
Cyan Dye Providing Compound (3)
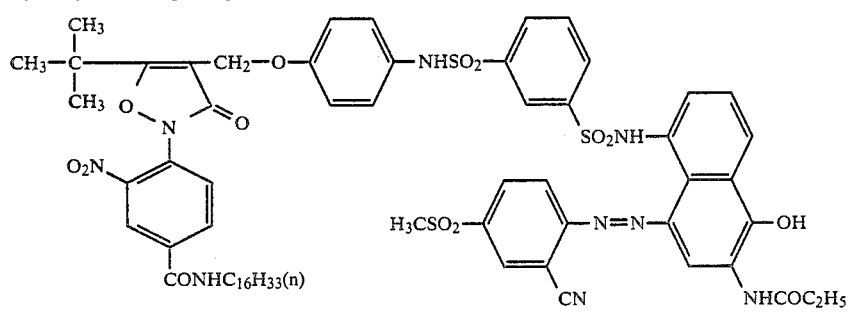
Antifogging agent (1)
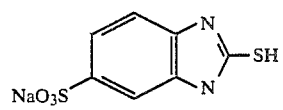
Sensitizing dye (D-22) for the third layer
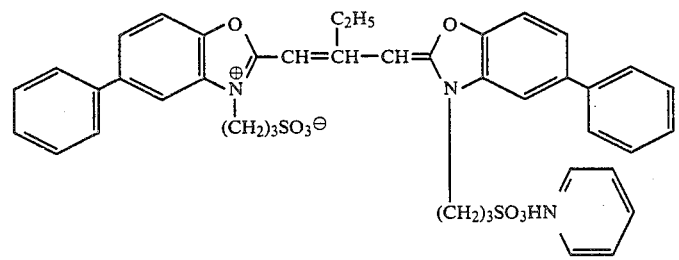
Sensitizing dye (D-51) for the first layer
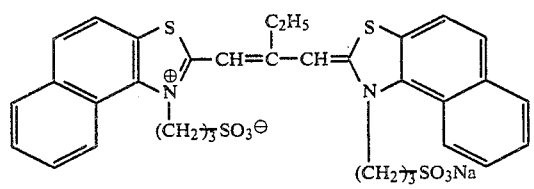
Electron donor (ED-1)
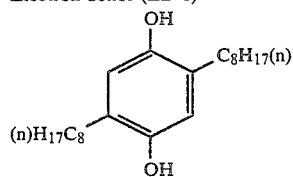
Reducing agent (ED-7)

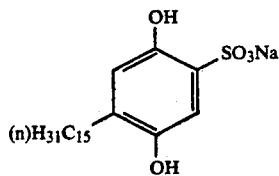

Electron transfer agent (X-2)

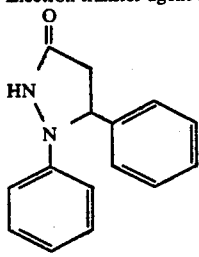

A process for the preparation of Emulsion (I) for the first layer is described hereinafter.

600 ml of an aqueous solution containing sodium chloride and potassium bromide and an aqueous solution of silver nitrate which had been prepared by dissolving 0.59 mol of silver nitrate in 600 ml of water were simultaneously added to an aqueous solution of gelatin which had been prepared by dissolving 20 g of gelatin and 3 g of sodium chloride in 1,000 ml of water and kept at a temperature of 75° C. at the same flow rate over a period of 40 minutes while the latter was being vigorously stirred. Thus, a monodispersed cubic silver chlorobromide emulsions (bromide content: 80 mol %) having an average particle size of 0.35 μm was prepared.

After being washed with water and desalted, the emulsion was chemically sensitized with 5 mg of sodium thiosulfate and 20 mg of 4-hydroxy-6-methyl-1,3,3a,7-tetraazaindene at a temperature of 60° C. The yield of the emulsion was 600 g.

A process for the preparation of Emulsion (II) for the third layer is described hereinafter.

600 ml of an aqueous solution containing sodium chloride and potassium bromide, an aqueous solution of silver nitrate which had been prepared by dissolving 0.59 mol of silver nitrate in 600 ml of water and Dye Solution (I) described below were simultaneously added to an aqueous solution of gelatin which had been prepared by dissolving 20 g of gelatin and 3 g of sodium chloride in 1,000 ml of water and kept at a temperature of 75° C. at the same flow rate over a period of 40 minutes while the latter was being stirred vigorously. Thus, a monodispersed cubic silver chlorobromide emulsion adsorbed with dye (bromide content: 80 mol %) having an average particle size of 0.35 μm was prepared.

After being washed with water and desalted, the emulsion was chemically sensitized with 5 mg of sodium thiosulfate and 20 mg of 4-hydroxy-6-methyl-1,3,3a,7-tetraazaindene at a temperature of 60° C. The yield of the emulsion was 600 g.

Dye Solution (I)

160 mg of Sensitizing dye (D-22) was dissolved in 400 ml of methanol.

A process for the preparation of Emulsion (III) for the fifth layer is described hereinafter.

1,000 ml of an aqueous solution containing potassium iodide and potassium bromide and an aqueous solution of silver nitrate which had been prepared by dissolving 1 mol of silver nitrate in 1,000 ml of water were simultaneously added to an aqueous solution of gelatin which had been prepared by dissolving 20 g of gelatin and ammonia in 1,000 ml of water and kept at a temperature of 50° C. with maintaining the pAg at a constant value while the latter was being stirred vigorously. Thus, a monodispersed octahedral silver iodobromide emulsion (iodide content: 5 mol %) having an average particle size of 0.5 μm was prepared.

After being washed with water and desalted, the emulsion was gold- and sulfur-sensitized with 5 mg of chloroauric acid (tetrahydrate) and 2 mg of sodium thiosulfate at a temperature of 60° C. The yield of the emulsion was 1 kg.

A process for the preparation of a gelatin dispersion of a dye providing compound is described hereinafter.

13 g of Yellow dye providing compound (1), 6.5 g of Organic Solvent Having a High Boiling Point (1) and 6.5 g of Electron donor (ED-1) were dissolved in 37 ml of cyclohexanone, the resulting solution was mixed with stirring with 100 g of a 10% aqueous solution of gelatin and 60 ml of a 2.5% aqueous solution of sodium dodecylbenzenesulfonate, and the mixture was then dispersed by means of a homogenizer at 10,000 rpm for 10 minutes. The dispersion thus obtained was designated a dispersion of yellow dye providing compound.

16.8 g of Magenta dye providing compound (2), 8.4 g of Organic Solvent Having a High Boiling Point (1) and 6.3 g of Electron donor (ED-1) were dissolved in 37 ml of cyclohexanone, the resulting solution was mixed with stirring with 100 g of a 10% aqueous solution of gelatin and 60 ml of a 2.5% aqueous solution of sodium dodecylbenzenesulfonate, and the mixture was then dispersed by means of a homogenizer at 10,000 rpm for 10 minutes. The dispersion thus obtained was designated a dispersion of magenta dye providing compound.

15.4 g of Cyan dye providing compound (3), 7.7 g of Organic Solvent Having a High Boiling Point (1) and 6.0 g of Electron donor (ED-1) were dissolved in 37 ml of cyclohexanone, the resulting solution was mixed with stirring with 100 g of a 10% aqueous solution of gelatin and 60 ml of a 2.5% aqueous solution of sodium dodecylbenzenesulfonate, and the mixture was then dispersed by means of a homogenizer at 10,000 rpm for 10 minutes. The dispersion thus obtained was designated a dispersion of cyan dye providing compound.

Light-Sensitive Material 402 was prepared in the same manner as described for Light-Sensitive Material 401, except for using Compound (2) according to the present invention in place of Yellow dye providing compound (1).

A process for the preparation of the dye fixing material is described hereinafter.

A Dye Fixing Material R-3 was prepared by coating each layer having the composition shown in Table 3 below on a glass plate for liquid crystal color filter (Corning Fusion 7059).

TABLE 3

| Third Layer: | |
|---|---|
| Gelatin | 0.05 g/m² |
| Silicone oil*¹ | 0.04 g/m² |
| Surface active agent*² | 0.001 g/m² |
| Surface active agent*³ | 0.02 g/m² |
| Surface active agent*⁴ | 0.10 g/m² |
| Picolinic acid guanidium | 0.45 g/m² |
| Polymer*⁵ | 0.24 g/m² |
| Second Layer: | |
| Mordant*⁶ | 2.35 g/m² |
| Polymer*⁷ | 0.60 g/m² |
| Gelatin | 1.40 g/m² |
| Polymer*⁵ | 0.21 g/m² |
| Organic solvent having a high boiling point*⁸ | 1.40 g/m² |
| Picolinic acid guanidium | 1.80 g/m² |
| Surface active agent*² | 0.02 g/m² |
| First Layer: Red-Sensitive Layer | |
| Gelatin | 0.45 g/m² |
| Surface active agent*⁴ | 0.01 g/m² |
| Polymer*⁵ | 0.04 g/m² |
| Hardening agent*⁹ | 0.30 g/m² |
| Support: | |
| Glass plate (surface treated) | |

The additives shown in Table 3 above are illustrated below.

Silicone Oil*¹

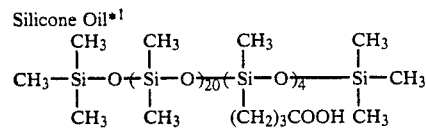

Surface Active Agent*²
Aerosol ® OT
Surface Active Agent*³

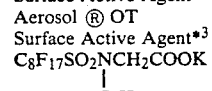

Surface Active Agent*⁴

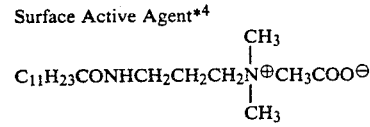

Polymer*⁵
Copolymer of vinyl alcohol and sodium acrylate (75:25 in molar ratio)
Polymer*⁷
Dextran (molecular weight: 70,000)
Mordant*⁶

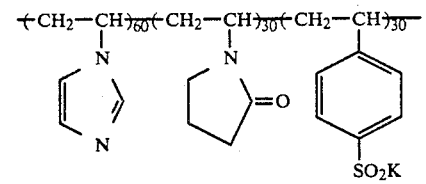

Organic Solvent Having a High Boiling Point*⁸
Reofos ® 95 manufactured by Azinomoto Co., Inc.

Hardening agent*⁹

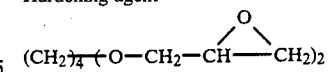

The multilayer color light-sensitive material as described above was exposed to light through a color separation mosaic filter of B, G and R and black stripe for 1/10 second at 5,000 lux using a tungsten lamp. On the emulsion side surface of the exposed light-sensitive material transported at a line speed of 20 mm/sec. was supplied water at a rate of 12 ml/m² by a wire bar and then immediately it was superimposed on the dye fixing material in such a manner that their coated layers were in contact with each other. These materials were heated for 30 seconds using a heat roller which had been so adjusted that the temperature of the layers having absorbed therein water became 90° C.

Then, the dye fixing material was peeled apart from the light-sensitive material, whereupon clear blue, green, red and black images were evenly obtained in the dye fixing material corresponding to the color separation mosaic filter of B, G, R and black, respectively, with respect to Light-Sensitive Materials 401 and 402.

Densities of B, G, R and black were measured at the center of pixel. The results are shown below.

| Light-Sensitive | Density | | | |
|---|---|---|---|---|
| Material | B | G | R | BL |
| 401 | 1.80 | 1.82 | 1.85 | 2.00 |
| 402 | 1.81 | 1.81 | 1.88 | 2.05 |

From the results shown above, it can be seen that Light-Sensitive Material 402 using the yellow dye providing compound according to the present invention can form good color image in this process.

Further, peak transmittance of each of R, G and B was more than 70%.

Then, Light-Sensitive Materials 401 and 402 were wholly exposed to light through a yellow filter for 1/10 second at 5,000 lux and subjected to the subsequent procedure in the same manner as described above using Dye Fixing Material R-3 to prepare transferred images. The dye fixing materials having the transferred image were washed with distilled water for 30 seconds, dried and then subjected to heat-fastness and light-fastness tests. The conditions of the heat-fastness light-fastness tests were the same as those described in Examples 1 and 2, but the time for irradiation was one month and the time for heating was three hours. The results obtained are shown below.

| Light-Sensitive Material | Light-Fastness (%) | Heat-Fastness (%) |
|---|---|---|
| 401 | 85 | 79 |
| 402 | 93 | 92 |

The light-fastness and heat-fastness shown above are indicated by the ratio of remaining density at λmax based on the fresh density respectively. From the above results it is apparent that stable images can be obtained in case of using the light-sensitive element containing the compound according to the present invention.

EXAMPLE 5

By eliminating the components shown below from Light-Sensitive Material 402 described in Example 4, Light-Sensitive Material 501 was prepared.

Sixth Layer: Matting agent, ZnSO₄·7H₂O
Fourth Layer: Zn(OH)₂
Second Layer: Zn(OH)₂

Also, by eliminating the components shown below from Dye Fixing Material R-3 described in Example 4, Dye Fixing Material R-4 was prepared.

Third Layer: Picolinic acid guanidium
Second Layer: Picolinic acid guanidium

Color Light-Sensitive Material 501 was exposed to light through a mosaic filter (photomask) of B, G, R and black stripe for 1/10 second at 5,000 lux using a tungsten lamp. On the emulsion side surface of the exposed light-sensitive material transported at a line speed of 15 mm/sec., a processing solution (10% guanidium carbonate +0.5% sodium hydrogencarbonate aqueous solution) was supplied at a rate of 15 ml/m² by a wire bar and then immediately it was superimposed on Dye Fixing Material R-4 so that the two materials were closely in contact with each other by using a press at room temperature for 30 seconds and then placing the materials between a press heated at 90° C. for 30 seconds to bring about heat transfer.

Dye Fixing Material R-4 wa peeled apart from Light-Sensitive Material 501, whereupon a mosaic color filter of B, G, R and black was obtained in the image receiving material corresponding to the mosaic filter of B, G, R and black.

Each pixel has B, G and R of spectral absorption sufficient for a color filter, and unevenness and defects were not observed therein.

Then, the color filter was washed with distilled water at 25° C. for 30 seconds and dried. Then, on the layer surface of the dye fixing material was coated polyglycidyl methacrylate (PGMA)* at a layer thickness of 1 μm by spin coating, and this coating was then subjected to heat treatment to form a firm protective layer.

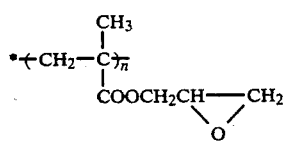

The color filter layer was then covered with indium tin oxide (ITO) by ion plating to form a common electrode.

Then, the ITO layer was covered with a polyimide layer and subjected to rubbing treatment to prepare a liquid crystal aligning film.

Another substrate constituting a liquid crystal cell was prepared by forming a electrode having the same pattern as that of the color filter in a well known manner, wiring and covering with an aligning film.

The above described two substrates were laminated to each other, and liquid crystal was poured therebetween to prepare a liquid crystal cell.

The liquid crystal cell thus-prepared is satisfactory for a display in view of its brightness and fastness (heat fastness and light-fastness) as compared with a liquid crystal cell using a color filter prepared by a dyeing method.

While the invention has been described in detail and with reference to specific embodiments thereof, it will be apparent to one skilled in the art that various changes and modifications can be made therein without departing from the spirit and scope thereof.

What is claimed is:

1. A light-sensitive element for the diffusion transfer process which comprises a support having thereon a light-sensitive silver halide emulsion layer having associated therewith a yellow dye providing compound represented by the following general formula (I):

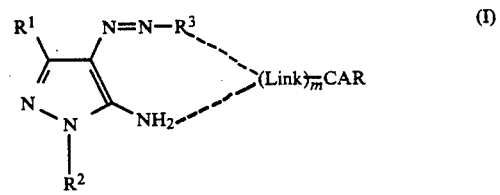

wherein CAR represents a carrier moiety which is capable of releasing a diffusible dye from the compound in correspondence or counter-correspondence to development under alkaline conditions; Link represents a group connecting CAR with a diffusible dye; m represents 0 or 1; the dotted lines mean that at least one of the dotted lines is a bond; $R^1$ represents a hydrogen atom, an alkyl group, an aryl group, an alkoxy group, an aryloxy group, an alkoxycarbonyl group, an aryloxycarbonyl group, an alkoxycarbonyl group or a carbamoyl group; $R^2$ represents an alkyl group or an aryl group; and $R^3$ represents an aryl group excepting an aryl group having a Hammett's $\sigma_p$ value less than 0.01.

2. A light sensitive element as claimed in claim 1, wherein the moiety of —$R^2$—Link—$_m$CAR or —$R^3$—Link—$_m$CAR is represented by the following general formula:

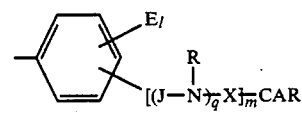

wherein X represents a divalent linking group of the formula —$R^4$—$L_n$—$R_p{}^4$—, wherein $R^4$'s, which may be the same or different, each represents an alkylene group having from 1 to about 8 carbon atoms, a phenylene group or a substituted phenylene group having from 6 to about 9 carbon atoms; L represents a divalent group selected from an oxy group, a carbonyl group, a carboxamido group, a carbamoyl group, a sulfonamido group, a sulfamoyl group, a sulfinyl group or a sulfonyl group; n represents an integer of 0 or 1; and p represents 1 when n is 1, and p represents 1 or 0 when n is 0, provided that when p is 1, the number of carbon atoms included in both $R^4$ groups does not exceed 14 in total; R represents a hydrogen atom or an alkyl group having from 1 to about 6 carbon atoms; J represents a divalent group selected from a sulfonyl group and a carbonyl group; m and q each represents an integer of 0 or 1; E represents a hydrogen atom, a chlorine atom, a bromine atom, a fluorine atom, an alkyl group having from 1 to about 4 carbon atoms, an alkoxy group having from 1 to about 4 carbon atoms, an aryl group having from 6 to about 10 carbon atoms, a cyano group, a trifluoromethyl group, a nitro group, an alkylsulfonyl group having from 1 to about 8 carbon atoms, a substituted alkylsulfonyl group having from 1 to about 8 carbon atoms which is substituted with a substituent selected from a hydroxyl group, a phenyl group, a cyano group, a sulfamoyl group, a carboxyl and a sulfo group, a phenylsulfonyl group, a substituted phenylsulfonyl group substituted with a carboxyl group, a hydroxyl group, a sulfamoyl group or a sulfo group, a carboxylic acid ester group having the formula —COOR$^5$, wherein R$^5$ represents an alkyl group having from 1 to about 18 carbon atoms, a phenyl group, or a substituted phenyl group substituted with a chlorine atom or a nitro group, a sulfo group, a sulfamoyl group having the formula —SO$_2$NR$^6$R$^{7'}$ wherein R$^6$ represents a hydrogen atom or an alkyl group having from 1 to about 6 carbon atoms; and R$^7$ represents a hydrogen atom, an alkyl group having from 1 to about 6 carbon atoms, an alkyl group having from 1 to about 6 carbon atoms which is substituted with a hydroxyl group, a cyano group, a fluorosulfonyl group, a carboxyl group or a sulfo group, a benzyl group, a phenyl group, a substituted phenyl group which is substituted with a hydroxyl group, a sulfonyl group, a sulfamoyl group, a carboxyl group or a sulfo group, an alkylcarbonyl group having from 1 to about 8 carbon atoms, or a phenylcarbonyl group having from 6 to about 9 carbon atoms, provided that the number of carbon atoms included in both R$^6$ and R$^7$ does not exceed 14 in total, a carbamoyl group having the formula —CON(R$^6$)$_2$, wherein R$^6$'s, which may be the same or different, each represents a hydrogen atom or an alkyl group having 1 to about 6 carbon atoms, or a carboxyl group.

3. A light sensitive element as claimed in claim 1, wherein CAR is selected so that the compound represented by the general formula (I) is a non-diffusible image forming compound which is oxidized as a result of development, thereby undergoing self-cleavage and releasing a diffusible dye.

4. A light-sensitive element as claimed in claim 1, wherein CAR is selected so that the compound represented by the general formula (I) is a non-diffusible image forming compound which releases a diffusible dye in the presence of a base as a result of self cyclization but which, when reacted with an oxidation product of a developing agent, substantially never releases the dye.

5. A light-sensitive element as claimed in claim 1, wherein CAR is selected so that the compound represented by the general formula (I) is a non-diffusible image forming compound which itself does not release any dye but, upon reaction with a reducing agent, releases a dye.

6. A light-sensitive element as claimed in claim 1, wherein the light-sensitive element further contains a reducing substance.

7. A light-sensitive element as claimed in claim 6, wherein the reducing substance is a hydroquinone compound, a 3-pyrazolidone compound, an aminophenol compound, a catechol compound, a p-phenylenediamine compound, an aminonaphthol compound or a reductone compound.

8. A light-sensitive element as claimed in claim 1, wherein the light-sensitive element further contains an organic silver salt.

* * * * *